(12) United States Patent
Weatherhead et al.

(10) Patent No.: US 9,031,975 B2
(45) Date of Patent: May 12, 2015

(54) CONTENT MANAGEMENT

(71) Applicant: Rockwell Automation Technologies, Inc., Mayfield Heights, OH (US)

(72) Inventors: Norman Weatherhead, Ayr (CA); Andrew R. Stump, Mentor, OH (US); Haithem Mansouri, Beachwood, OH (US); Axel Rodriguez, Aurora, OH (US); Joachim Thomsen, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 7 days.

(21) Appl. No.: 13/670,156

(22) Filed: Nov. 6, 2012

(65) Prior Publication Data
US 2014/0129550 A1 May 8, 2014

(51) Int. Cl.
*G06F 17/30* (2006.01)
*G06Q 10/10* (2012.01)

(52) U.S. Cl.
CPC .......... *G06F 17/30554* (2013.01); *G06F 17/30* (2013.01); *G06Q 10/103* (2013.01)

(58) Field of Classification Search
USPC .................................................. 707/723, 769
See application file for complete search history.

(56) References Cited

U.S. PATENT DOCUMENTS

| | | | |
|---|---|---|---|
| 5,801,701 A | 9/1998 | Koppolu et al. | |
| 5,983,019 A | 11/1999 | Davidson | |
| 5,991,538 A | 11/1999 | Becker | |
| 6,170,081 B1 | 1/2001 | Fontana et al. | |
| 6,185,733 B1 * | 2/2001 | Breslau et al. | 717/163 |
| 6,275,976 B1 | 8/2001 | Scandura | |
| 6,321,374 B1 | 11/2001 | Choy | |
| 6,405,364 B1 | 6/2002 | Bowman-Amuah | |
| 6,430,556 B1 * | 8/2002 | Goldberg et al. | 1/1 |
| 6,571,232 B1 * | 5/2003 | Goldberg et al. | 1/1 |
| 6,601,234 B1 | 7/2003 | Bowman-Amuah | |
| 6,662,357 B1 | 12/2003 | Bowman-Amuah | |
| 6,684,261 B1 | 1/2004 | Orton et al. | |
| 6,981,215 B1 | 12/2005 | Lindhorst et al. | |
| 6,999,956 B2 | 2/2006 | Mullins | |
| 7,003,773 B2 | 2/2006 | Hoennig et al. | |
| 7,103,874 B2 | 9/2006 | McCollum et al. | |

(Continued)

FOREIGN PATENT DOCUMENTS

WO 0116725 A2 3/2001

OTHER PUBLICATIONS

Non-Final Office Action for U.S. Appl. No. 13/670,051, dated Mar. 6, 2014, 22 pgs.

(Continued)

*Primary Examiner* — Joshua Bullock
(74) *Attorney, Agent, or Firm* — Amin, Turocy & Watson, LLP

(57) ABSTRACT

Content management includes populating a library with modular objects and metadata associated with the modular objects. In response to a query, the library can be searched based in part on the metadata. The query can relate to implementation of an industrial process. One or more modular objects in the library can be identified as satisfying the query. A result of the query can be output and the output can include the identified modular objects and the respective metadata associated with the identified modular objects. The metadata can be anything known about the object that might not be accessible at runtime control.

20 Claims, 19 Drawing Sheets

(56) References Cited

U.S. PATENT DOCUMENTS

| | | | |
|---|---|---|---|
| 7,222,114 | B1 | 5/2007 | Chan |
| 7,240,327 | B2 | 7/2007 | Singh et al. |
| 7,322,024 | B2 | 1/2008 | Carlson et al. |
| 7,434,203 | B2 | 10/2008 | Stienhans et al. |
| 7,454,743 | B2 | 11/2008 | Fuchs |
| 7,472,375 | B2 | 12/2008 | Ye et al. |
| 7,546,576 | B2 | 6/2009 | Egli |
| 7,565,643 | B1 | 7/2009 | Sweet et al. |
| 7,685,577 | B2 | 3/2010 | Pace et al. |
| 7,721,259 | B2 | 5/2010 | Heinke et al. |
| 7,865,873 | B1 | 1/2011 | Zoellner et al. |
| 7,877,731 | B2 | 1/2011 | Bekelman |
| 7,949,997 | B2 | 5/2011 | Chessell et al. |
| 7,958,486 | B2 | 6/2011 | Tsyganskiy et al. |
| 7,966,523 | B2 | 6/2011 | Weatherhead |
| 8,010,940 | B2 | 8/2011 | van Wyk et al. |
| 8,069,437 | B2 | 11/2011 | Aigner et al. |
| 8,219,974 | B2 | 7/2012 | Schmidt |
| 8,423,950 | B2 | 4/2013 | Dettinger et al. |
| 8,448,137 | B2 | 5/2013 | Kaetker et al. |
| 8,458,215 | B2 * | 6/2013 | Dettinger et al. ............ 707/781 |
| 8,584,081 | B2 | 11/2013 | Fernando et al. |
| 8,713,527 | B2 | 4/2014 | Frontiero et al. |
| 8,732,658 | B2 | 5/2014 | Plache et al. |
| 2002/0111829 | A1 | 8/2002 | Robibero |
| 2003/0135842 | A1 | 7/2003 | Frey et al. |
| 2003/0158871 | A1 | 8/2003 | Fomenko |
| 2005/0071810 | A1 | 3/2005 | Sutter et al. |
| 2005/0114288 | A1 * | 5/2005 | Dettinger et al. ................. 707/1 |
| 2006/0150148 | A1 * | 7/2006 | Beckett et al. ................ 717/109 |
| 2006/0294509 | A1 | 12/2006 | Mital et al. |
| 2007/0220415 | A1 * | 9/2007 | Cheng et al. .................. 715/503 |
| 2008/0098378 | A1 * | 4/2008 | Kilbane et al. ................ 717/162 |
| 2009/0031291 | A1 | 1/2009 | Adams |
| 2009/0327991 | A1 | 12/2009 | Weatherhead |
| 2009/0327992 | A1 * | 12/2009 | Weatherhead ............... 717/102 |
| 2010/0042376 | A1 * | 2/2010 | Weatherhead ..................... 703/1 |
| 2010/0050020 | A1 * | 2/2010 | Weatherhead ................. 714/38 |
| 2010/0082145 | A1 | 4/2010 | Weatherhead |
| 2010/0250867 | A1 | 9/2010 | Bettger et al. |
| 2011/0022987 | A1 | 1/2011 | Brubaker |
| 2011/0252402 | A1 | 10/2011 | Sanoy |
| 2012/0078431 | A1 | 3/2012 | Weatherhead |
| 2012/0078432 | A1 | 3/2012 | Weatherhead et al. |
| 2012/0079157 | A1 | 3/2012 | Weatherhead |
| 2012/0083906 | A1 | 4/2012 | Weatherhead et al. |

OTHER PUBLICATIONS

Non-Final Office Action for U.S. Appl. No. 13/670,144, dated Mar. 4, 2014, 20 pgs.

Notice of Allowance dated Jul. 8, 2014 for U.S. Appl. No. 13/670,144, 22 pages.

Sato et al, "Exploratory Analysis of Collaborative Web Accessibility Improvement". ACM Transactions on Accessible Computing, vol. 3, No. 2, Article 5, Pub. Date: Nov. 2010. Retrieved on Jul. 8, 2014, 30 pages.

Schatzl, et al., "Optimized Memory Management for Class Metadata in a JVM", ACM, pp. 151-160, 2011. Retrieved on Jul. 8, 2014, 30 pages.

Corcho, et al, "Grid Metadata Management: requirements and architecture", IEEE, pp. 97-104, 2007. Retrieved on Jul. 8, 2014, 8 pages.

Hackl, et al, Synchronous Metadata Management of Large Storage Systems, ACM, pp. 1-6, 2010. Retrieved on Jul. 8, 2014, 6 pages.

Kappel, et al, A Framework for Workflow Management Systems Based on Objects, Rules and Roles, ACM, pp. 1-5, 2000. Retrieved on Jul. 21, 2014, 5 pages.

Non-Final Office Action dated May 30, 2014 for U.S. Appl. No. 13/670,172, 49 pages.

Notice of Allowance dated Jul. 21, 2014 for U.S. Appl. No. 13/670,051, 21 pages.

Manolescu, "Workflow Enactment with Continuation and Future Objects", ACM, pp. 40-51, 2002. Retrieved on Jul. 21, 2014, 12 pages.

Javadi et al, "Decentralized Orchestration of Data-centric Workflows Using the Object Modelling System" 2012 12th IEEE/ACM International Symposium on Cluster, Cloud and Grid Computing. Retrieved on Jul. 21, 2014, 8 pages.

Harrison, et al, "Object Reuse and Exchange for Publishing and Sharing Workflows", ACM, pp. 67-76, 2011. Retrieved on Jul. 21, 2014, 10 pages.

European Search Report dated Jun. 13, 2014 for European Application No. 13 19 1731, 6 pages.

European Search Report dated Jul. 28, 2014 for European Application No. 13 19 1728, 9 pages.

Vyatkin, et al, "OOONEIDA: An Open, Object-Oriented Knowledge Economy for Intelligent Industrial Automation", IEEE Transactions on Industrial Informatics, pp. 4-17, vol. 1, No. 1, Feb. 2005, 14 pages.

Office Action dated Oct. 8, 2014 for U.S. Appl. No. 13/670,166, 51 pages.

Office Action dated Nov. 28, 2014 for U.S. Appl. No. 13/670,172, 60 pages.

* cited by examiner

CONTENT MANAGEMENT

TECHNICAL FIELD

The subject disclosure relates generally to industrial automation design and, also generally, to design objects for industrial automation applications.

BACKGROUND

The wide adoption of computer networking capability and processing power in industrial environments has resulted in the increased usage of industrial automation systems. These industrial automation systems can be complex and are expected to incorporate functional cooperation between different components of the industrial automation systems. The different components might be supplied by one vendor, or in many cases, more than one vendor. Therefore, there is often limited interoperability and consistency between components. On the user side, the limited interoperability and consistency has been blamed for user dissatisfaction. On the vendor side, interoperability with components from a different vendor is not necessarily a priority.

SUMMARY

The following presents a simplified summary in order to provide a basic understanding of some aspects of the subject disclosure. This summary is not an extensive overview and it is not intended to identify key or critical elements of all aspects nor delineate the scope of any or all aspects. The sole purpose of this summary is to present some concepts of one or more aspects in a simplified form as a prelude to the more detailed description that is presented later.

An aspect relates to a system that comprises a memory and a processor communicatively coupled to the memory. The memory stores computer-executable instructions and the processor facilitates execution of the computer-executable instructions to at least populate a library with a plurality of modular objects and metadata associated with the plurality of modular objects. The processor also facilitates execution of the computer-executable instructions to at least search the library in response to a query related to implementation of an industrial process, wherein the search is based in part on the metadata. The processor also facilitates execution of the computer-executable instructions to at least identify one or more modular objects from the plurality of modular objects that satisfy the query and output a result of the query. The output includes the one or more modular objects and respective metadata associated with the one or more modular objects.

Another aspect relates to a method that comprises creating, by a system including a processor, a library that includes one or more objects and one or more metadata related to the one or more objects. The method also comprises distinguishing, by the system, a first object of the one or more objects in the library that matches a request. Further, the method comprises presenting, by the system, a visual representation of the first object and at least a first metadata from the one or more metadata, wherein the first metadata is related to the first object.

A further aspect relates to a system that comprises a memory and a processor communicatively coupled to the memory. The memory stores computer-executable instructions and the processor facilitates execution of the computer-executable instructions to at least receive, from a source program, design input related to workflow development. Further, the processor facilitates execution of the computer-executable instructions to at least create a workflow design based in part on the design input. The processor also facilitates execution of the computer-executable instructions to at least integrate selected objects into the workflow design, wherein functionally associated with the selected objects is exposed within the workflow design and output the workflow design on a device.

Yet another aspect relates to a method that comprises receiving, by a system including a processor, a request for development of a workflow and accessing, by the system, design input associated with a source program and a library comprising objects and associated metadata. The method also comprises building, by the system, the workflow based on the design input, the objects, and the associated metadata; and outputting, by the system, the workflow to a user or to an external system.

Still another aspect relates to a system that comprises a memory and a processor, communicatively coupled to the memory. The memory stores computer-executable instructions and the processor facilitates execution of the computer-executable instructions to at least create a plurality of modular objects and integrate functionalities into each modular object of the plurality of modular objects, wherein at least one functionality is integrated with at least one modular object. The processor also facilitates execution of the computer-executable instructions to at least receive a request for execution of a set of the plurality of modular objects and expose the functionalities during an execution of the set of the plurality of modular objects.

Another aspect relates to a method that comprises constructing, by a system including a processor, a library comprising a first object and a second object and embedding, by the system, a first functionality with the first object and a second functionality with the second object. The method also comprises executing, by the system, at least one of the first object and the second object and displaying, by the system, the first functionality, the second functionality, or both the first functionality and the second functionality as a result of the executing.

Yet another aspect relates to a system that comprises a memory and a processor, communicatively coupled to the memory. The memory stores computer-executable instructions and the processor facilitates execution of the computer-executable instructions to at least output a set of objects and a set of functionalities in response to a request for design of an object and receive a selection of a first object from the set of objects and a first functionality from the set of functionalities. The processor also facilitates execution of the computer-executable instructions to at least apply a set of rules to the first object and the first functionality and bind the first object and the first functionality as a result of the applied set of rules.

A further aspect relates to a method comprising evaluating, by a system including a processor, a design request for a data model comprising a set of objects and outputting, by the system, alternative objects and associated functionalities related to the data model. The method also includes receiving, by the system, an indication that one or more alternative objects and associated functionalities are to be included in the data model and applying, by the system, a set of rules to the included one or more alternative objects and associated functionalities. Further, the method comprises creating, by the system, the data model that comprises the selected one or more alternative objects, the associated functionalities, and the applied set of rules.

To the accomplishment of the foregoing and/or related ends, the following description and annexed drawings set forth certain illustrative features of one or more aspects.

These features are indicative, however, of but a few of various ways in which principles of various aspects may be employed. Other advantages and distinctive features will become apparent from the following detailed description when considered in conjunction with the drawings and the disclosed aspects are intended to include all such aspects and their equivalents.

DETAILED DESCRIPTION

Figure 1:
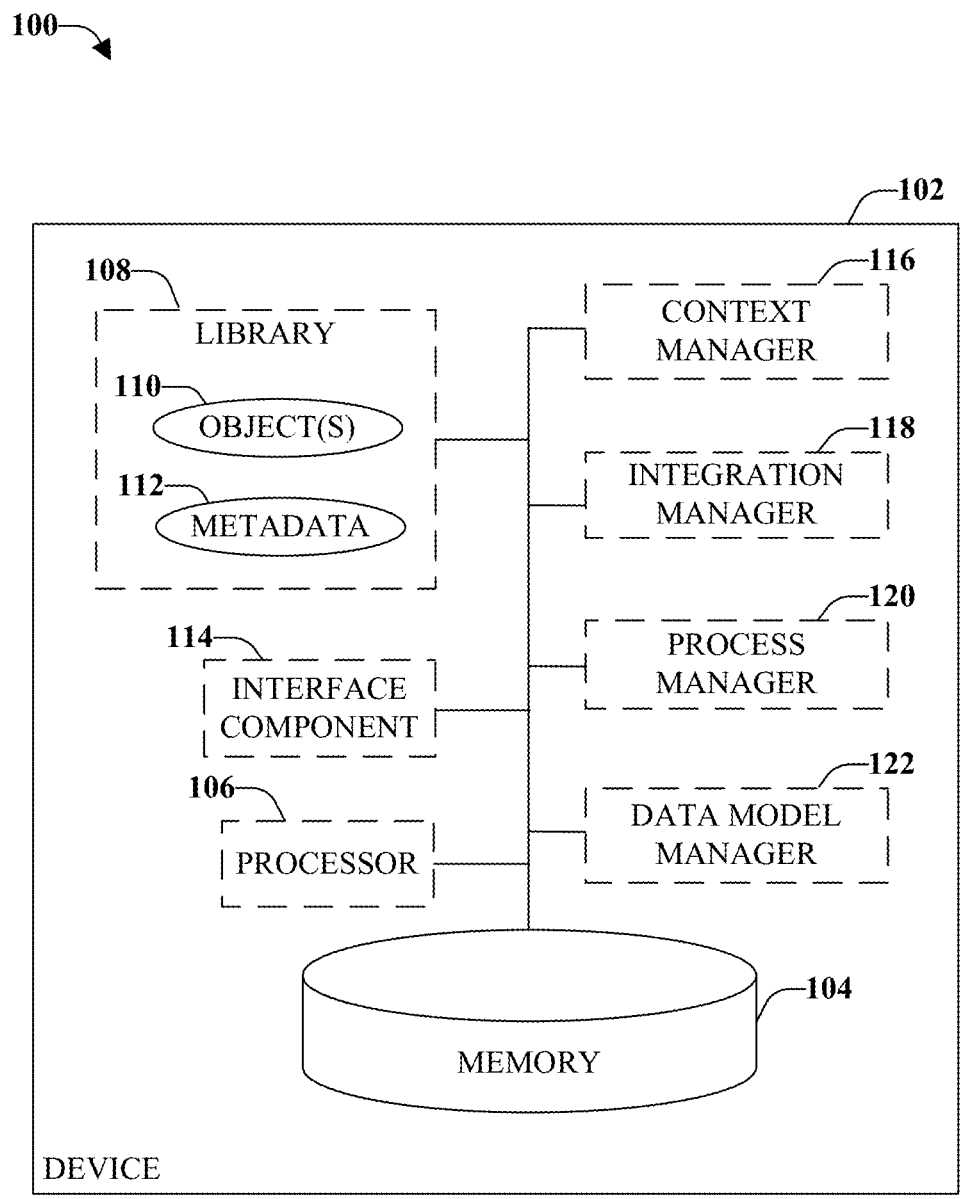
FIG. 1 illustrates an example, non-limiting system that can be configured to provide a holistic, bottom-up approach to facilitate the design, management, and use of objects for industrial applications, as well as for other types of applications, according to an aspect.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

It is noted that various embodiments of the systems, apparatuses, and/or processes explained in this disclosure can constitute machine-executable components embodied within one or more machines, such as, for example, embodied in one or more computer readable mediums (or media) associated with one or more machines. Such component(s), when executed by the one or more machines (e.g., computer(s), computing device(s), virtual machine(s), and so on) can cause the machine(s) to perform the operations described.

Industrial automation generally refers to the use of control systems to increase productivity and/or quality of an industrial process. A process that facilitates the production of goods and/or the delivery of services is referred to herein as an "industrial process". Further, a device and/or a set of devices that manage, command, direct, and/or regulate the behavior of itself and/or other devices utilized within an industrial process is referred to herein as a "control system".

Due to outsourcing of engineering, regulatory compliance, and/or efforts to decrease product cycle times, users of industrial automation equipment expect all elements of the operation to provide rich, consolidated, and integrated information regarding the product, even on the first day of production. To provide such benefits, the disclosed aspects facilitate the automation of machines, production lines, and processes that can be engineered in a common context (e.g., a context that is generic or reusable across applications, machines, vendors, technologies, and so forth). Further, with the disclosed aspects, the integrated information can be available in the applications that operate the industrial automation equipment, regardless of the number of diverse vendors and/or components associated with such industrial automation equipment and systems. Further, the disclosed aspects can provide a shift from the ability to exchange information (e.g., syntax) to the inherent provision of the content of information (e.g., semantics).

The disclosed aspects can facilitate the development of business models to provide entire production lines with information that can help overcome challenges associated with increases in engineering costs, decreases in market prices of machines, production shift to emerging markets, and increased end user demands. Further, the disclosed aspects can be configured to provide prefabricated application technology, which can be immediately usable in the machine in order to counteract the increase in lower skill sets, increased engineering costs, and lower differentiation of machines.

FIG. 1 illustrates an example, non-limiting system 100 that can be configured to provide a holistic, bottom-up approach to facilitate the design, management, and use of objects for industrial applications, as well as for other types of applications, according to an aspect. For example, the objects can be used by a control system to manage, command, direct, and/or regulate the behavior of other devices utilized within an industrial process. Examples of control systems include, but are not limited to, programmable logic controllers (PLCs), programmable automation controllers (PACs) and other control devices that can be utilized within an industrial process.

System 100 can be included, at least partially, on a device 102, which can be, for example, a machine, industrial equipment, an industrial automation system, a desktop computer, a tablet computer, a laptop computer, a gaming device, a mobile phone, and/or other types of communication devices. The bottom-up approach can be provided based in part on reusable content, which can allow for an industry specific focus.

As utilized herein, the term "object" generally refers to one or more pieces of software code that can be utilized with industrial automation systems (e.g., industrial automation applications). Objects can be reusable software that can be applied across applications and can expose functionalities of components (e.g., hardware (e.g., devices), software, or both hardware and software) of an industrial automation application while also providing abstraction from details of communication and interaction with various components of the industrial automation systems.

Objects can also be customizable such that the objects contain code segments that can be quickly and easily customized for an application within an industrial automation system. The details of communication and interaction with components of an industrial application can be customized for a specific application without the need for the entire code to be reprogrammed. Additionally, although used herein in the singular, the term "object" can be a combination (e.g., an application) of two or more individual objects.

Reference to the "design of objects" generally refers to customization of objects for one or more applications (e.g., to be used by one or more control systems). The design of objects can include creation, customization, and/or manipulation of one or more objects, which can be implemented automatically and/or manually. For example, when objects are being created, information or metadata associated with the object can be manually defined by the designer. In another example, when objects are used for a particular application, metadata associated with the object can be created and/or existing metadata can be annotated. In still another example, information or metadata associated with objects can be automatically applied based on a source of the object (e.g., if the object is pulled from another application, metadata associated with the other application is automatically applied).

The term "application" or "industrial automation application" is utilized herein to refer generally to control code (utilized by a control system) for processes that can facilitate the production of goods and/or the delivery of services. For example, an application can comprise one or more objects that are linked and that can operate together to satisfy a workflow. For example, a workflow can define a production goal for an industrial process and/or a rule for the industrial process. A configuration of one or more objects (e.g., an application) can be identified and the objects can be linked in order to satisfy the production goal and/or the production rule of the workflow.

With continuing reference to FIG. 1, the system 100 can include at least one memory 104 that can store computer executable components and instructions. System 100 can also include at least one processor 106 that can facilitate execution of the computer executable components and instructions stored in the memory 104. The processor 106 can be communicatively coupled to the at least one memory 104. Coupling can include various communications including, but not limited to, direct communications, indirect communications, wired communications, and/or wireless communications. It is noted that although one or more computer executable components may be described herein and illustrated as components separate from memory 104 (e.g., operatively connected to memory), in accordance with various embodiments, the one or more computer executable components could be stored in the memory 104. Further, while various components have been illustrated as separate components, it will be appreciated that multiple components can be implemented as a single component, or a single component can be implemented as multiple components, without departing from example embodiments.

Also included in system 100 can be a data store, referred to as a library 108, which can store one or more objects 110. Although used in the singular, a library can refer to a single library or to a set of libraries (comprised of two or more libraries). The objects 110 stored in the library 108 can be re-used (e.g., reusable) and/or customized (e.g., customizable). The objects 110 can be standard objects (e.g., unmodified objects), customized objects, or a combination of standard objects and customized objects can be contained in the library 108. In an implementation, the standard objects and customized objects can be differentiated in order to facilitate discovery of both types of objects. For example, the standard objects and the customized objects can be represented differently to facilitate discovery of both object types.

In accordance with some aspects, the library 108 can also store applications created by linking objects and, therefore, can hold both objects and applications. According to another aspect, the applications can be converted to searchable objects, which can be stored and/or searched in a similar manner as standard objects and/or customized objects can be stored and/or searched.

In an implementation, the library (e.g., a single library or set of libraries) can be a public library (e.g., global library). In another implementation, the library can be a private library (e.g., local library). A set of libraries can include public libraries, private libraries, or combinations thereof (e.g., two or more public libraries, two or more private libraries, one or more private libraries and one or more public libraries, and so forth). Further, the single library of set of libraries can be hosted at one or more locations (e.g., distributed across multiple data stores and/or multiple locations).

A public or global library can be hosted through a public network, a public server, available over the Internet, as a cloud computing solution, and so forth. In an example, a public library can be in the form of a Web application. A public library can be accessible according to one or more public security protocols and/or public security procedures. For example, a global security protocol can apply to a set of devices that are communicatively coupled over a wide area network. According to an aspect, the security protocol can be an open security protocol, which can allow users to view objects contained in the library for free (e.g., there is no cost associated with viewing the objects) or based on receipt of payments (e.g., there is an associated cost to view the objects). In an example where the object can be viewed without payment, utilization of other functions (e.g., download, annotations, and so forth) associated with the library and objects contained therein can be restricted until proper payment is received (e.g., fee based access). In another example, payment for access to the library might be necessary before the object can be viewed and other actions performed (e.g., fee associated with viewing, using, and/or manipulating the objects).

A private or local library can be accessible through a private network, such as a factory network, a work place network (e.g., Intranet), a network applied according to an industrial protocol, such as EtherNet/IP or Common Industrial Protocol, and so forth. A private security protocol can be utilized such that only authenticated users have access to the private library. For example, the private security protocol can apply to a set of devices that are communicatively coupled by one or more local area networks. The rights assigned to each authenticated user can be a function of the user's role, position, security ranking, and so forth. For example, a machine operator might have limited rights while a designer or engineer might have unlimited rights. In another example, a private library can be an individual's personal library, wherein the individual that owns the library has unlimited access to the library while access by other users is denied and/or limited.

As discussed above, an object can be software code that can be utilized for industrial automation applications. The software code can be reusable software and/or customizable piece(s) of software that can expose functionalities of components (both hardware and software) of an industrial automation application, while providing abstraction from details of communication and interaction of such components of the industrial automation application. Objects have at least some degree of modularity and can also be referred to as a "module" and/or a "modular object". Modularity generally refers to the ability of separating an object from other objects and/or combining an object with other objects. Modular objects allow programmers to focus on the functionality of the object rather than the mechanics of implementation. Further, objects can be used to facilitate the integration of different devices, which provides a standard programming tool that can interface between the different devices.

An object can include one or more functionalities that can allow the object to be implemented in various applications. For example each object (e.g., each item of the compatible items in the library) can comprise a set of common (e.g., global) functions, a set of item specific functions, a set of industry specific functions, a set of customer (e.g., end user) specific functions, or combinations thereof. In an implementation, each function can have a set of defined interfaces. For example, attributes of a function can include a human machine interface, an interface to other functions within a programmable automation controller, a historian, reporting attributes, project documentation, module documentation, training material, tools, and/or quality attributes.

Also included in the library 108 can be one or more metadata 112. In an example, each object 110 can be associated with at least one metadata 112. In another example, multiple design objects can be associated with the same metadata, such as when multiple design objects are used for a same product line or for different product lines. However, in some cases, different objects can be associated with different metadata. Metadata can be created when an object is designed and/or after the object is designed, such as when the object, or a collection of objects, is utilized and a user annotates the metadata and/or creates new metadata. Additionally or alternatively, metadata can be created automatically based on an inference of information that should be associated with an associated object (e.g., if an object is pulled from an external system, information about the external system can be included as metadata).

Metadata 112 can identify an object and/or features of the object. Metadata 112 can also facilitate searches for the object and/or other actions. In an example, metadata can include information related to the creator of the object (e.g., designer's name, designer's contact information, and so forth). In another example, metadata can include information related to the functionality of the object. According to another example, the metadata can include information related to an application in which the object and/or the functionality can be implemented. In a further example, the metadata can include information related to a product for which the object and/or the functionality has been designed. In still another example, the metadata can include a definition, which can be a reusable definition that can include program code that can alter a state of one or more resources in an industrial automation system (e.g., logic code that can control the opening and/or the closing of a valve). The program code can be for example, ladder logic, function chart, script, JAVA, C code, and so forth. In another example, the program code can be automation content including, but not limited to, operator visualization screens, management information dashboards, production recipe objects, and so on. Further, the metadata can include a specification, which can comprise one or more resources that can include one or more of equipment, material, personnel, segments, storage, and so on. In an example, a resource can be a valve that is opened and/or closed according to logic code.

In an embodiment, the library 108 can be retained in memory 104, can be separate from memory 104, or can be retained in another component of device 102. However, according to some aspects, the library 108, objects 110, and/or related metadata 112 is not stored on the device 102 but is accessible by device 102 from an internal source, an external source, or both an internal source and an external source. For example, objects 110 and related metadata 112 can be stored in another component of device 102 or can be stored external to device 102, such as by another device and/or component of system 100 and/or a different system, and can be accessible by device 102 over an air interface, over a wired interface, over the Internet, or through other communication means. For example, due to storage capacity and/or processing capabilities, it might be beneficial to retain objects and related metadata external to device 102 and, when needed, device 102 can selectively retrieve objects and related metadata from the external source.

Device 102 can also include an interface component 114 that can be configured to allow information to be conveyed (e.g., communicated) to and/or from the device 102. For example, interface component 114 can be a user interface such as a screen, a display, a keyboard, a microphone, and/or another means that allows the user to communicate with the system (e.g., facilitates the transmittal and/or receipt of various types of communications). Interface component 114 can allow a designer and/or a user the ability to view objects and/or metadata, annotate objects and/or metadata, and/or add new objects and/or metadata. In an example, interface component 114 can allow disparate types of objects to be grouped as related for a particular purpose (e.g., for a particular application).

Interface component 114 can convey information through audible means (e.g., a microphone/speaker pair), through visual means (e.g., a display or screen), and/or through other means of conveying information (e.g., the illumination of lights, (which can be colored lights), tactile means (including vibration) and so forth. In an implementation, the interface component 114 can be a display integrated with device 102 or a display operatively connected to device 102 (e.g., hosted by an external source). In an additional or alternative implementation, the interface component 114 can be a microphone/speaker integrated with device 102 or a microphone/speaker operatively connected to device 102 (e.g., hosted by an external source).

In an aspect, the interface component 114 can provide a graphical user interface (GUI), a command line interface, a speech interface, Natural Language text interface, and the like. For example, a GUI can be rendered that provides a user with a region or means to load, import, select, read, and so forth, various requests and can include a region to present the results of such. These regions can comprise text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed. Thus, it might be inferred that the user did want the action performed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, the disclosed aspects are not so limited and, for example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Also included in system 100 can be a context manager 116 that can be configured to maintain the content, which includes the objects 110 and the metadata 112. In an implementation, context manager 116 can be configured to facilitate identification of the types of applications for which an object is suitable. In another implementation, context manager 116 can facilitate the evaluation of objects 110 and/or metadata 112 and the selective retrieval and collation of objects 110 and/or metadata 112 in response to one or more queries. According to a further implementation, context manager 116 can also be configured to facilitate the rating of content and/or provide a list of suggestions related to the one or more queries. For example, a platform built on the basis of a website that allows various users to add, modify, delete, rate, and perform other actions with respect to content through, for example, a web browser (e.g., wiki) can be facilitated by context manager 116. The user provided information can be utilized in order to provide suggestions and/or to perform other actions with respect to the content.

System 100 can also include an integration manager 118 that can be configured to enhance and optimize workflow design. According to an implementation, integration manager 118 can facilitate dynamic matching of the objects 110 and/or the metadata 112 with information coming from other systems and/or with information going to other systems. For example, the information coming from other systems can include external source objects that can be used in the automation of an industrial control process. In another example, information going to other systems, such as a target system, can include objects that comprise a common interface that allows the objects to be deployed on the target system.

Also included in system 100 can be a process manager 120 that can be configured to facilitate the generation of diagnostic information and usage of diagnostic capabilities within industrial automation systems. For example, based on a request for initiation of a workflow, process manager 120 can retrieve objects from the library 108 and evaluate diagnostic capabilities of each of the objects. If the retrieved objects do not include a diagnostic capability needed for the workflow, a request can be sent to include the missing diagnostic capability in the workflow, wherein an object with the recommended diagnostic capability can be created and/or retrieved from an external source.

Further, system 100 can include a data model manager 122 that can be configured to assist with object design and/or application design. For example, data model manager 122 can facilitate the recommendation of a set of objects and associated metadata for creation of a hierarchical data model. Rules can be selectively applied to the set of objects. Further, objects that are validated by the rule can be incorporated into the hierarchical data model. Metadata associated with the objects in the hierarchical data model can be exposed to a user, or hidden from the user, based on an identification of the user (e.g., security credentials, a user's role, and so forth).

Additional information related to the context manager 116, the integration manager 118, the process manager 120, and the data model manager 122 will be provided with reference to the following figures. Further, although illustrated and described as located on device 102, one or more of the components can be located external to the device 102.

Figure 2:
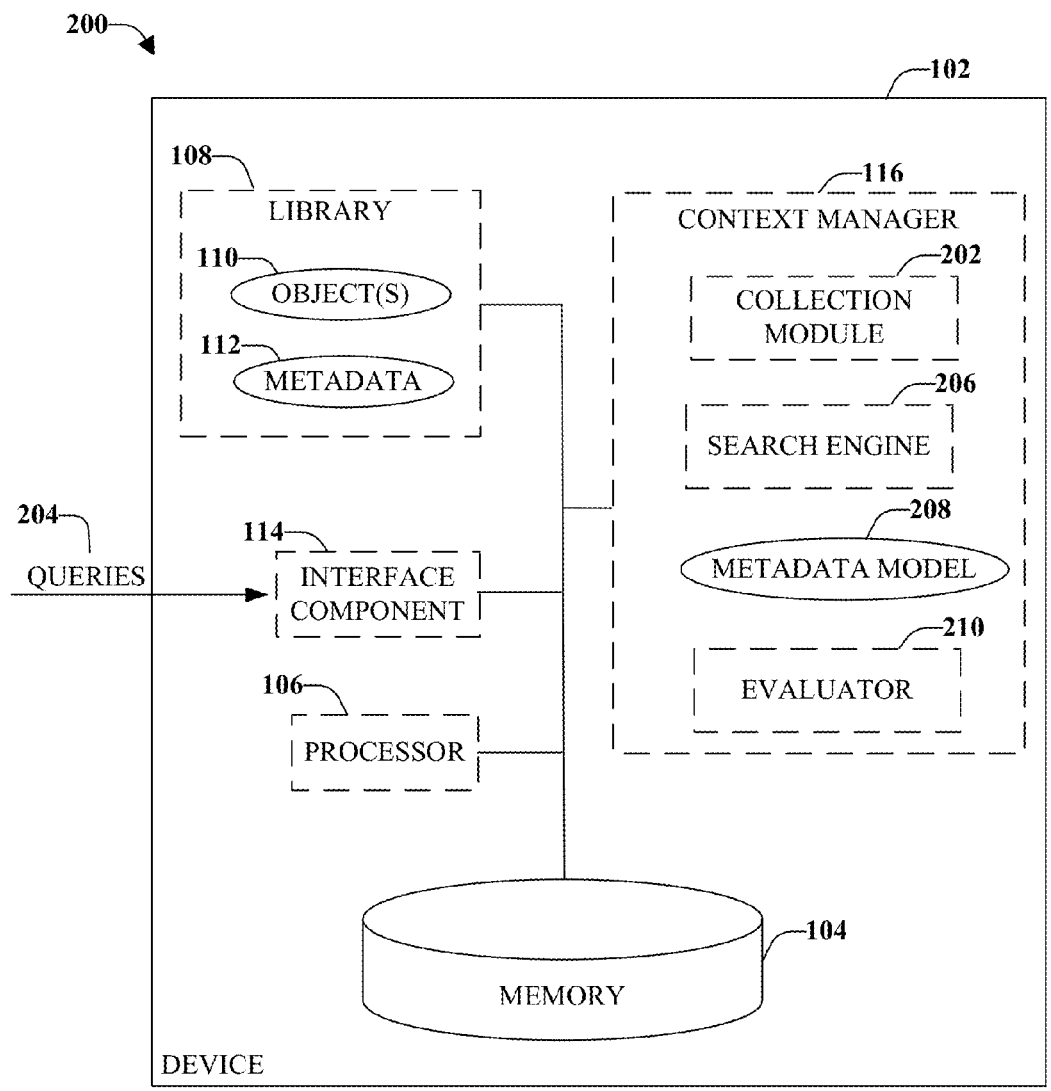
FIG. 2 illustrates an example non-limiting system configured to maintain content, including the objects and the metadata, according to an aspect.

FIG. 2 illustrates an example non-limiting system 200 configured to maintain content, including the objects 110 and the metadata 112, according to an aspect. As design libraries become populated with hundreds, if not thousands, of design objects and modules, it can become difficult for developers (and others) to identify objects or modules of interest. The disclosed aspects can identify types of applications for which an object is suitable and manage the content. System 200 can aggregate content (e.g., objects, metadata, and so forth) and provide a visual representation of the content, which can be represented in the form of grouped content (e.g., a metadata model). Further, system 200 can provide a flexible and extensible design library that can expose underlying models and features of an automation collaborative framework and design environment for software development.

As objects 110 are created, the designer can associate metadata 112 with the objects 110. The metadata associated with each object at the time of creation can include a description of the object, one or more applications in which the object is intended to be used, as well as other information (e.g., creator identity, linkages to other objects, and so on). Metadata 112 can also be annotated as the objects are used. The objects and related metadata can be received by the interface component 114, which can communicate directly with the designer or user or indirectly through another device, system, and/or entity (e.g., over the Internet). Metadata 112 allows the system to understand the objects (e.g., what the objects are used for, potential applications of the objects, related objects, and so forth). The metadata 112 can also allow the system to provide query results (e.g., query the metadata), and/or to indicate searches to the user (e.g., produce a list of suggestions).

Since the objects are modular (e.g., modular objects), an application for which the object was designed might not be the only application for which the object can be used. Thus, annotations to the metadata can expand the library 108. Further, metadata 112 can allow objects 110 to be searchable. Metadata 112 can include a description of the object, which can include what the object does (e.g., its purpose), keywords that describe the object, and other information that might be useful for identifying and applying the objects in an industrial automation system (and/or another system). Metadata can be anything known about the object that might not be accessible at runtime control. For example, the metadata can identify for which types of application the object is suitable.

In an implementation, user interface component 114 can allow authors (e.g., designers) and/or users to create and/or annotate metadata 112. Identifiable data can include, for example, descriptors, keywords, information about where the object has been used, versioning data, author, validation, safety, and so forth. Such aspects can be employed for any suitable object or module that may not be accessible by runtime control. Context manager 116 can be configured to associate metadata 112 with one or more objects 110. Thus, metadata 112 can provide a means for objects 110 to be self-describing as well as searchable.

Included in system 200 can be a collection module 202 that can be configured to populate the library with a plurality of modular objects and metadata associated with the plurality of modular objects. For example, the collection module 202 can receive objects and associated metadata at about the same time as the objects are created or at a different time. For example, as one or more objects are used, new metadata might be created and/or existing metadata might be modified and/or deleted. Thus, collection module 202 can also be configured to update the library as changes are made to the objects and/or metadata.

One or more queries 204 related to design and/or implementation of an industrial process (e.g., industrial automation application) can be received by the interface component 114. For example, a user might want to automate a mixer in an industrial environment and the query can be a request for information about how to automate the mixer. For example, the query can be in natural language such as "How do I automate a mixer". In another example, the interface component 114 can output pictures or text that allow a user to select desired content (e.g., a picture of mixer can be presented). The interface component 114 can step the user through a series of screens, which can allow the user to drill down to the desired content. As new data is available based on received user input, the interface component 114 can selectively provide more information (e.g., additional pictures or text) that a user can use to find desired information.

The query information can be conveyed to the context manager 116, which can be configured to facilitate the evaluation of the objects 110 and/or the metadata 112 so that a result of the query can be provided to the user. In an implementation, a search engine 206 can be configured to receive and execute the queries 204 related to searches associated with design objects 110. In an implementation, the search engine 206 can perform a search of the library 108 based in part on the metadata 112. For example, search engine 206 can expose a metadata model 208, which can be used to identify one or more appropriate objects to employ in connection with a design task. The metadata model 208 can be dynamic, wherein various configurations of objects 110 can be evaluated to determine one or more combinations of objects that could be utilized to satisfy the query.

According to an aspect, search engine 206 can collect keywords and other data (e.g., from the metadata 112) and an evaluator 210 can identify one or more objects from library that satisfy the query. According to an implementation, search engine 206 can optionally index objects and/or modules as well as crawl the objects and/or modules for information. For example, as the user starts to build their application and use the code, the user initially begins by choosing objects from the library. A list of items in the library can be presented to the user based on a request. Metadata that matches the request can be used to present the list of objects to the user.

In an implementation, evaluator 210 can analyze a set of modules comprised of device modules, wherein the analysis goes beyond mere collection of keywords. For example, evaluator 210 can determine how the modules should be connected at the next level up and such connections can be displayed (e.g., by the interface component 114). In another example, evaluator 210 can analyze keywords in each query and search for the keywords, or synonyms thereof, within the metadata 112. When one or more modular objects from the plurality of modular objects that satisfy the query are identified by evaluator 210 (e.g., a match is found), the associated object can be categorized as a potential solution, or portion of the solution, that would answer the query.

Based on the match, a result of the query, which can be in the form of a metadata model 208, can be output to the user through interface component 114, for example. The output can include the one or more modular objects and respective metadata.

Figure 3:
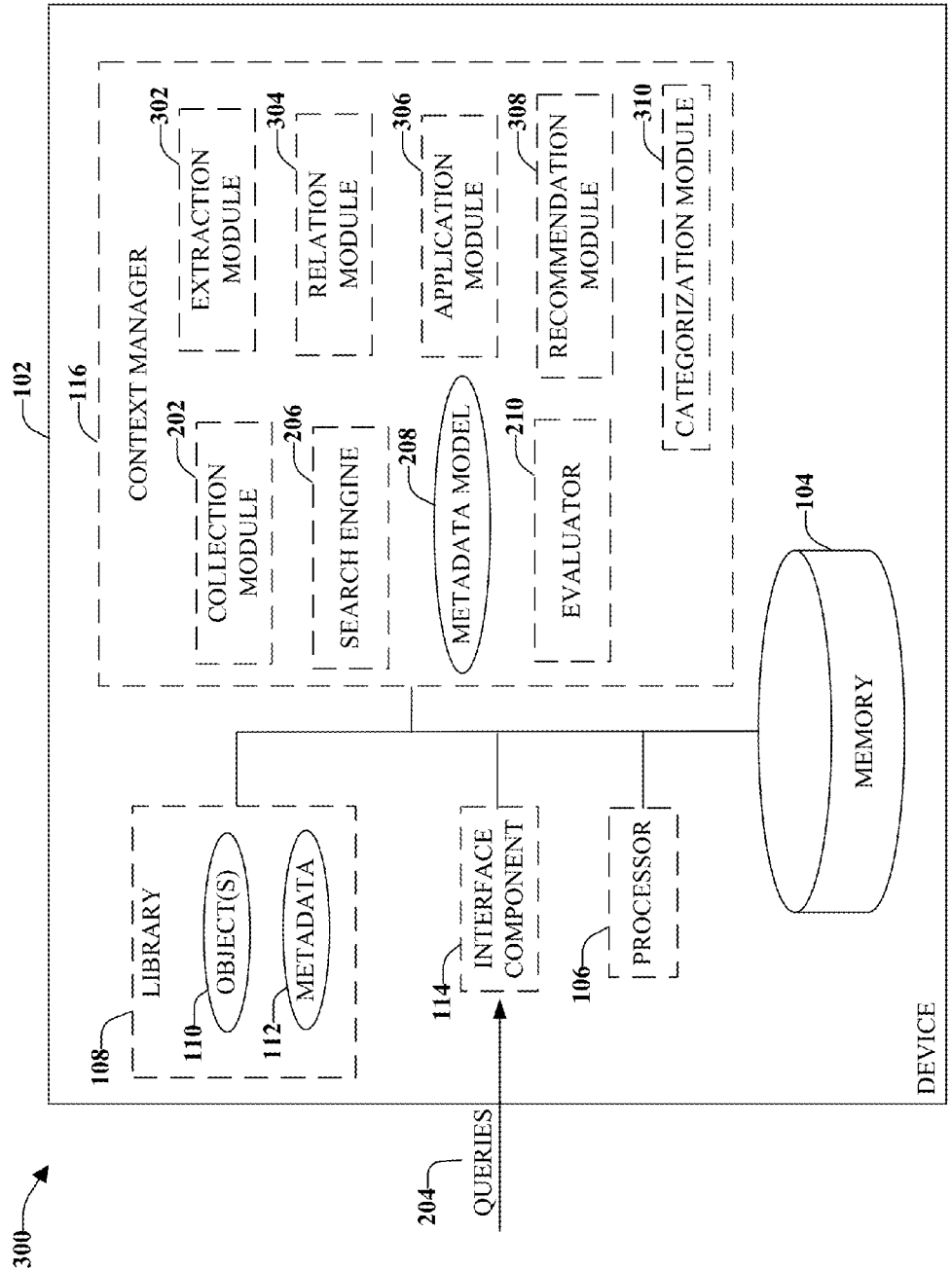
FIG. 3 illustrates an example, non-limiting system for responding to a query for implementation of an industrial process, according to an aspect.

FIG. 3 illustrates an example, non-limiting system 300 for responding to a query for implementation of an industrial process, according to an aspect. In order to respond to a query, information related to the query needs to be applied to the modular objects 110 and/or the metadata 112 to provide useful results.

According to an implementation, an extraction module 302 can be configured to analyze each of the queries 204 and mine key words, terms, and/or phrases from the query. For example, if the query is "How do I automate a mixer?", the key terms mined by the extraction module 302 can be "automate" and/or "mixer". In another example, if the query is "How do I remove bacteria from the food production line?", the key terms mined can include "bacteria", "food", "production line", and/or "food production line". Extraction module 302 can further obtain synonyms, common misspellings, and/or related terms in order to determine the basis of the query.

Based on the key words, terms, and/or phrases mined by the extraction module 302 and/or the other items (e.g., synonyms, common misspellings, and so forth), a relation module 304 can be configured to match the key terms to the metadata 112. For example, relation module 304 can perform a one-to-one match between the mined key terms and key terms included in the metadata 112. In another example, relation module 304 can include a database (or can access a database) to determine related terms (e.g., synonyms, common misspellings, and so forth) in order to analyze the metadata 112, which can be in addition to or in lieu of such analysis being performed by extraction module 302.

It is noted that a database can include volatile memory or nonvolatile memory, or can include both volatile memory and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which can operate as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the various disclosed aspects is intended to comprise, without being limited to, these and any other suitable types of memory.

Relation module 304 can identify one or more metadata 112 that is a potential candidate for a response to the query. As a result of the identification, an application module 306 can be configured to access one or more modular objects associated with the metadata that matches the key terms. The one or more modular objects can be returned as a result of the query. For example, the interface component 114 can output the one or more objects in a perceivable format (e.g., visual, audible, and so forth).

Additionally or alternatively, a recommendation module 308 can be configured to suggest a subset of modular objects from the plurality of modular objects to employ for implementation of the industrial process. For example, the metadata 112 can include information related to what objects others, in the same or a similar business, have used to obtain the same result and/or a related result. For example, if the query is related to automating a mixer, others that have automated a mixer might have used a product or used one or more objects and/or one or more metadata. In this case, the recommendation can cause the product, one or more objects, and/or one or more metadata to be presented to the user (e.g., through the interface component 114) as suggestions. The user can make a selection of one or more of the products, objects, and/or metadata in order to automate their process.

In an implementation, recommendation module 308 can review other metadata (other than the metadata that matched the key term(s)) to determine if another object might be appropriate as an alternative in response to the query. If the review determines that the object is appropriate, the one or more objects are returned as a result of the query in the form of a suggested alternative. The suggested alternative can be presented to the user through the interface component 114.

Alternatively or additionally, recommendation module 308 can be configured to provide a list of suggestions related to the one or more queries 204 as a result of a ranking. In an implementation, a wiki-like platform can be employed that allows users to rate and/or annotate objects. For example, a user can interact with interface component 114 to enter information about each object, about one or more objects, or about a set of objects. The information can be saved as metadata 112 and can be associated with one or more objects 110. Further, a set of objects can be identified as a combination of objects.

In an implementation, a categorization module 310 can be configured to ranks object as a function of ratings received (e.g., through interface component 114). For example, the categorization module 310 can rank the object(s) based on user ratings (e.g., the objects with the most favorable ratings are ranked highest), based on the most popular ratings (e.g., the objects used the most), and so forth. The rankings can be output as a result of the query (e.g., through the interface component 114) and/or can be utilized by the evaluator 210 to determine which object(s) should be employed for a particular application. For example, if evaluator 210 is presented with two or more objects that have similar functionalities, the evaluator 210 can utilize the rankings to choose one of the objects instead of the other objects (e.g., the object with the higher ranking is preferred).

Figure 4:
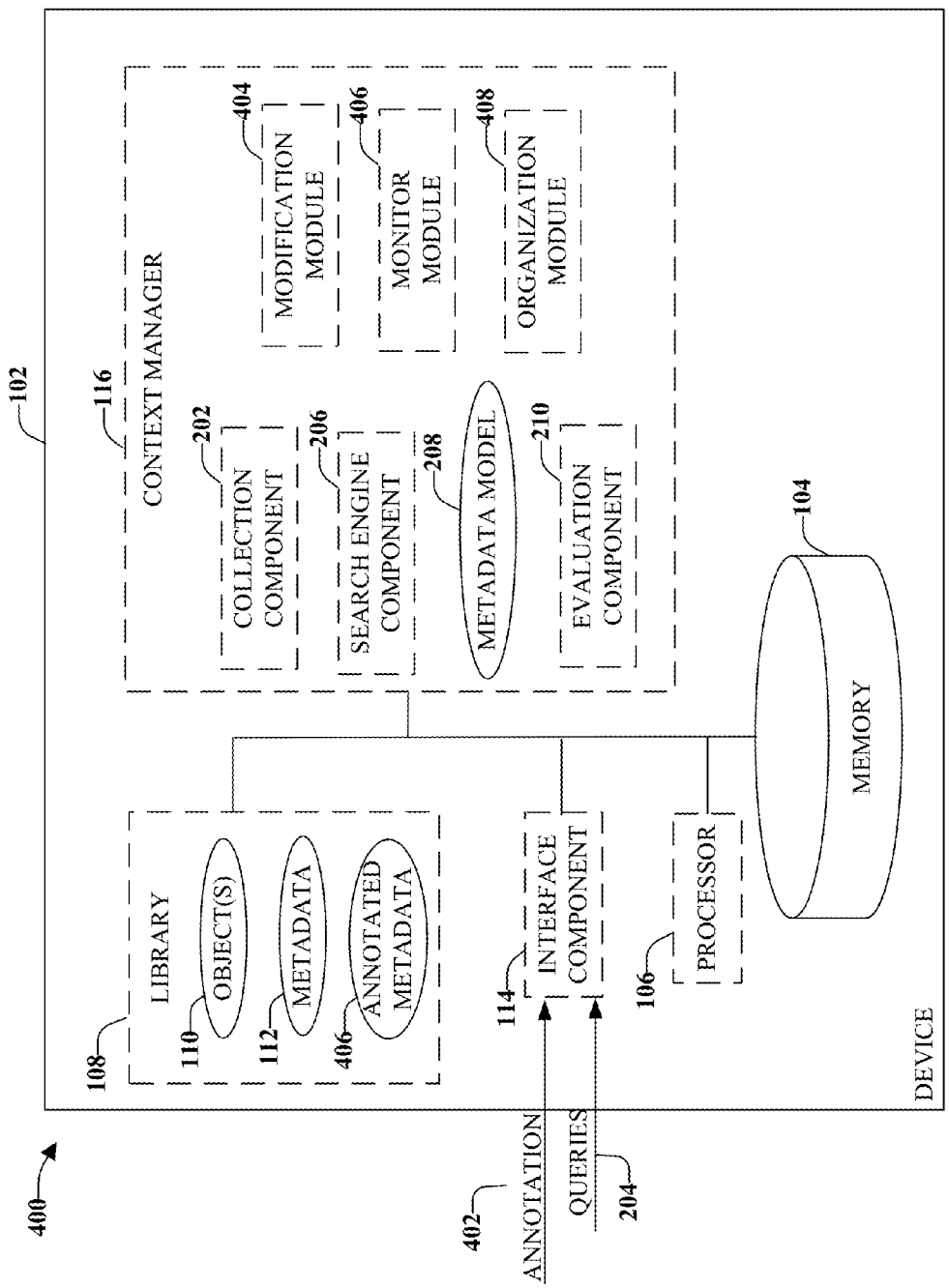
FIG. 4 illustrates an example, non-limiting system for manipulation of objects, according to an aspect.

FIG. 4 illustrates an example, non-limiting system 400 for manipulation of objects, according to an aspect. In an example, the objects can be manipulated manually, based on information received from a user. In another example, the objects can be manipulated dynamically or automatically by the system 300 based, in part, on usage of the objects as well as other intrinsic and/or extrinsic information (e.g., user input, observance by the system, and so forth).

In an implementation, a user that views the output (e.g., result) of the query might desire to make a change to an object and/or to the associated metadata. For example, metadata associated with a respective object might be received when the object is created and, therefore, it might be beneficial to update the metadata after the object has been used. The metadata can include functionalities of the associated modular object and/or the metadata could be industry application specific and include industry practice information. In another implementation, the metadata 112 can be tied to a customer and, as the customer accesses the system, the customer can see what others in the industry have been able to accomplish with the library content.

According to this implementation, interface component 114 can receive at least one user annotation 402 to at least one metadata. The annotation 402 can be input directly into the file that contains the metadata and/or can be received separately and applied to the metadata by the system 400. Based on the annotation information, a modification module 404 can be configured to apply the annotation 402 to the identified metadata and create at least one annotated metadata 406. The context manager 116 (or collection module 202) can populate the library with the annotated metadata 406. In an implementation, the original metadata 112 is retained such that both the original metadata 112 (e.g., unannotated metadata) and the annotated metadata 406 can be retrieved and presented in response to one or more queries 204.

In an additional or alternative implementation, metadata can be rolled up and combined to create new metadata when two or more objects are combined. Accordingly, metadata join operations can be performed to create new metadata. Metadata can be anything known about the object that is not accessible at runtime control and/or that is accessible at runtime control. Context manager 116 can be configured to evaluate objects 110 and/or metadata 112 and selectively retrieve and collate objects 110 and/or metadata 112 in response to one or more queries, according to an aspect.

System 400 can include a monitor module 408 that can be configured to observe usage of the plurality of modular objects 110. For example, monitor module 408 can review metadata for respective objects and note similarities of the metadata. Such similarities can be based on key words, key terms, key phrases, an expected end result, a reason as to why the object was created, a recommended usage, and so forth. Further, the similarities can be based on input that indicates two or more objects are duplicates (e.g., one or more of the objects can be removed from the library).

Based on the similarities, an organization module 410 can be configured to combine objects and/or metadata according to various parameters. For example, monitor module 408 can be configured to evaluate how objects are utilized and patterns. Thus, if two objects are always used together (e.g., a first object for initiating an alarm and a second object for silencing an alarm), monitor module 408 can identify the objects. Based on this identification, the organization module 410 can be configured to combine the two (or more) individual objects into a single object. Further, organization module 410 (and/or modification module 404) can combine or consolidate the related metadata and/or automatically create new metadata (e.g., annotated metadata 406) appropriate for the combined, single object.

As discussed, if the library 108 and associated content is exposed, the identity (e.g., metadata) of the objects can also be provided, which can allow developers, for example, to view the objects in a different manner and/or to consolidate objects. This can also facilitate a request for new objects, suggestions for new objects, as well as exposing additional functionalities for existing objects.

Figure 5:
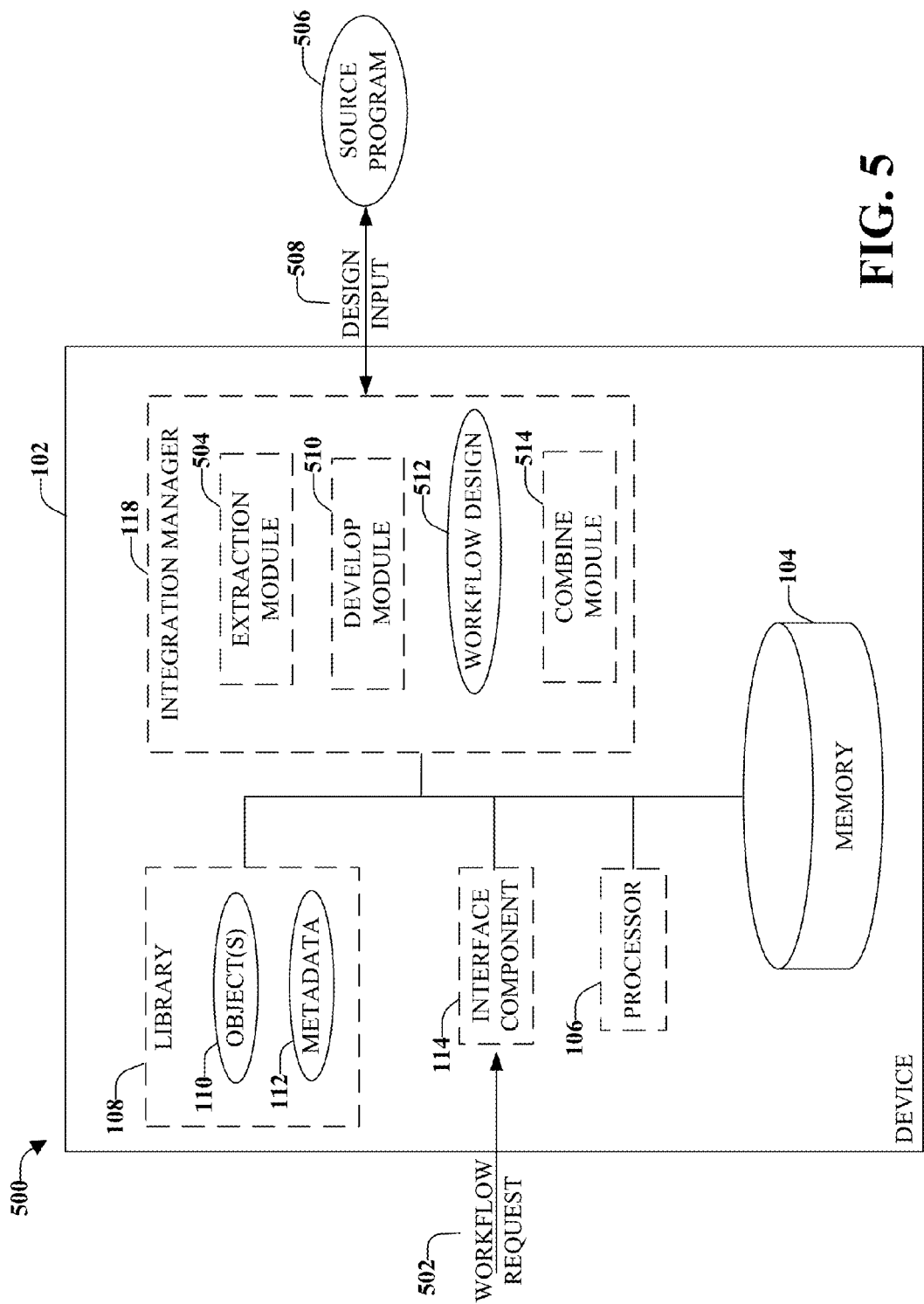
FIG. 5 illustrates an example, non-limiting system that can be configured to integrate workflows and library modules, according to an aspect.

FIG. 5 illustrates an example, non-limiting system 500 that can be configured to integrate workflows and library modules, according to an aspect. The various systems disclosed herein can provide a dynamic design environment that can integrate a workflow with library objects to enhance and optimize workflow design. For example, objects can expose and provide functionality and, when combined with other objects in a workflow context, can validate interconnectability of objects in accordance with the work and dataflow. In such a manner, workflow documents are no longer are static. Instead, the workflow documents can serve as the underlying program.

Integration manager 118 can be configured to facilitate a common interface that provides for the generation and/or the integration of objects and modules. For example, inter-processor communications (e.g., managing links between controllers) can be facilitated with the disclosed aspects. Two or more objects can have a common interface, regardless of whether the objects are deployed. The common interface can be provided through an underlying infrastructure, which can allow a developer and/or other user to visualize that the two objects are able to share data. The designer and/or other user does not need to see or understand the underlying infrastructure.

System 500 can be configured to receive a workflow request 502 from a user, for example. The workflow request 502 can be a request for development of a workflow. According to an implementation, the workflow request 502 is received by the interface component 114.

In response to the workflow request 502, an extraction module 504 can be configured to obtain, from a source program 506, design input 508 related to the workflow development. The source program 506 can be design tools and/or objects associated with an external system. The design input 508 can be obtained by extraction module 504 by, for example, matching one or more objects 110 in the library with information received from another system and/or with information going to another system. According to some aspects, before attempting to obtain the design input 508 from the source program 506, the library 108 is searched for appropriate design input that would satisfy the workflow request 502.

A develop module 510 can be configured to create a workflow design 512 based in part on the design input 508. Since the metadata received in the design input 508 could be dedicated to interfaces for a different system (e.g., a system on which the source program 506 is executing or running), wherein the interfaces might not be supported by the system 500, various criteria can be utilized by extraction module 504. For example, metadata associated with objects can be defined in the different system (e.g., the system associated with the source program). When that metadata is received, in (or associated with) the design input 508, extraction module 504 can evaluate the metadata and match the received metadata with metadata already included in the library 108.

Considerations can be given to commonalities across different software packages, such as different drawing applications. If a controller with input/output (I/O) cards or modules is to be created with a drawing application, similar information related to the I/O cards is needed, regardless of the drawing application product used. Thus, extraction module 504 can be configured to understand the form of what information is needed, which can be determined based on the metadata. This allows system 500 to shift from the ability to exchange information (e.g., syntax) to the inherent provision of the content of the information (e.g., semantics).

According to an implementation, extraction module 504 can be configured to access the information contained in the different system and harvest various information contained therein that can be used for the workflow design. In an aspect, extraction module 504 can be configured to review a database in the other system and/or a schema that can be interpreted to determine the location and type of objects that can be harvested from the other system. The workflow design 512 can be output to the user (e.g., through interface component 114 or another component).

In an implementation, after review of the workflow design 512 or during the development of the workflow design 512, a user might select one or more objects 110 that should be included in the workflow design 512. Thus, a combine module 514 can be configured to integrate objects selected by a user into the workflow design 512. Functionality associated with the selected objects can be exposed within the workflow design 512.

In accordance with an implementation, the non-selected objects can be retained in a holding area for future consumption. The non-selected objects can be stored in a database. For example, according to an aspect, bits of documentation and/or data that is not placed inside a project (e.g., a workflow design 512) can be placed in a "scrapbook" for later use.

Figure 6:
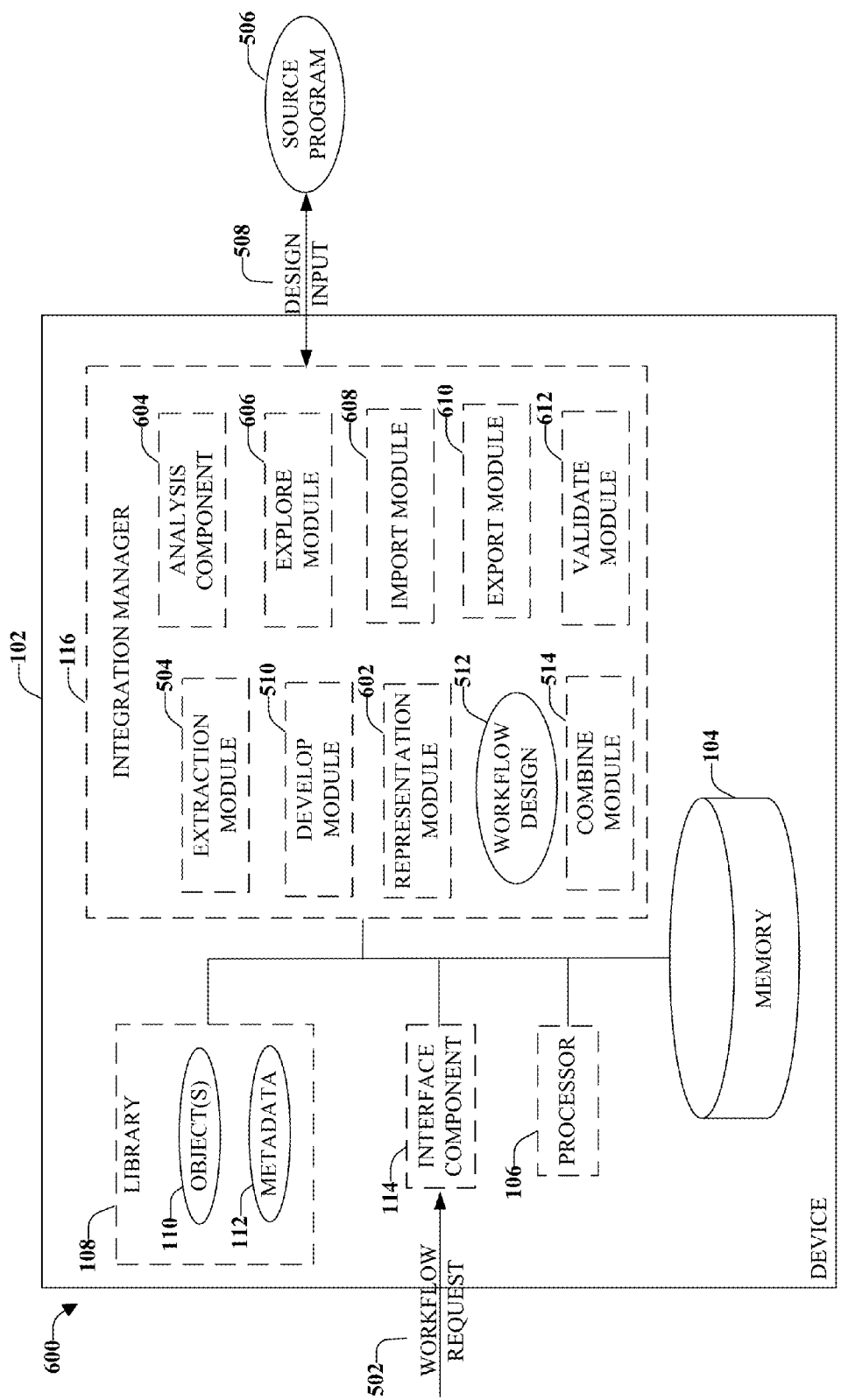
FIG. 6 illustrates an example, non-limiting system for identifying objects missing from a workflow design, according to an aspect.

FIG. 6 illustrates an example, non-limiting system 600 for identifying objects missing from a workflow design, according to an aspect. In addition to a workflow request 502, a user can select one or more objects 110 that should be included in a resulting workflow design 512. For example, an indication of the one or more objects can be received (e.g., by the interface component 114) at about the same time as the workflow request 502 is received and/or at a different time (e.g., while the workflow design is being created, after the workflow design is created, and so forth).

Included in system 600 can be a representation module 602 that can be configured to portray the workflow design and the selected object in a visual format (e.g., as a visual representation on a display screen). According to an implementation, representation module 602 and interface component 114 can interact in order to output the desired information. In an embodiment, when an object is selected, a visual window identifies to a developer pieces of the workflow design that are missing (e.g., in accordance with workflow as well as object/design rules), to cue the user as to which things are not wired up (e.g., portions of the workflow that are not connected).

For example, when an object is selected, a visual window can be provided that identifies to the developer (and/or other user) the pieces that are missing. The identification of the missing pieces can be based on the workflow. According to some aspects, the identification of the missing pieces can be based on object rules and/or design rules. Providing a visual representation of the missing objects cues the developer that items are still needed. According to some aspects, the representation is provided in another format, such as through audible means.

According to an aspect, two or more different types of views can be provided. A configuration interface (e.g., interface component 114) can comprise at least a portion of the two or more different types of views. According to an aspect, an organizational model can be provided of different types of views where a configuration interface can be part of a set of views. For example, when an industrial process or workflow design is being created, there might be alternatives as to some of the objects that can be utilized (e.g., two objects have a similar functionality and either object could be chosen). Therefore, the interface component 114 can provide the alternatives as different views, wherein one view can be superimposed on another view or multiple views can be superimposed on each other. The views that are superimposed can still retain distinguishing characteristics (e.g., different color schemes, different types of fonts, different backgrounds, and so on) so that a user does not confuse the object and/or metadata contained in each of the different views. In another example, one of the views can be a maintenance view, wherein a first view provides a visualization of an event (e.g., an alarm being triggered) and a second view provides a visualization of what was (or might have been) the triggering event.

Also included in system 600 can be an analysis module 604 that can be configured to identify objects missing from the visual representation of the workflow design 512. In an implementation, system 600 can also include an explore module 606 that can be configured to search the library 108 for the objects identified as missing from the workflow design 512, as determined by analysis module 604. For example, the explore module 606 can be configured to evaluate metadata 112 associated with the objects 110 and select at least one of the objects 110 to complete the workflow design 512. An import module 608 can be configured to import the one or more objects, from the library 108, into the workflow design 512 to eliminate the missing objects.

According to an implementation, if there are still objects missing from the workflow design after all possible objects from the library are imported, the explore module 606 can be configured to access one or more other systems (similar to source program 506) in an attempt to find the missing objects. The other systems can be systems different from system 600 (e.g., an external system). If the missing object is found from the external system, the import module 608 can request the missing object(s) from the external system and the missing objects(s) received from the external system can be applied to the workflow (e.g., by the combine module 514).

If the missing objects can still not be found, the missing portions of the visual representation can be identified and a prompt for user input can be presented. The prompt can inform the user that the missing objects are not available and the user can be provided the opportunity to perform one or more functions with respect to the missing objects (e.g., choosing a different or alternative object, create the missing object, and so forth).

System 600 can also include an export module 610 that can be configured to export the workflow design to an external system or to multiple external systems. For example, the selected objects can comprise a common interface that allows deployment of the workflow design on the external system. According to an implementation, the external system can be a system that interfaces with system 600, wherein information (e.g., content of respective libraries) are shared between the system 600 and the external system(s).

In an alternative or additional implementation, a validate module 612 can be configured to verify interconnectability of the selected objects and the workflow design. For example, the user is provided the opportunity to select one or more objects 110 for inclusion in the workflow design 512. However, the selected objects might not be compatible for the workflow design and, therefore, cannot (or should not) be incorporated into the workflow design, which can be determined by validate module 612.

In an implementation, validate module 612 performs the verification as a function of rules associated with the workflow design and/or at least one of the selected objects. For example, validate module 612 can apply rules associated with the workflow design or at least one of the select objects in order to validate the interconnectability.

According to another implementation, validate module 612 prioritizes a set of goals associated with the workflow design and/or at least one of the selected objects. Based on the prioritization, the validate module 612 verifies the interconnectability of the selected objects and the workflow design. For example, suggestions or recommendations can be provided to the developer as to other objects that should be included in the workflow design in place of the selected objects and/or in addition to the selected objects. If one or more of the selected objects are not compatible with the workflow design, as determined by validate module 612, the developer can be provided with alternative objects that could be used. Upon selection of one or more alternative objects, a further validation can be performed. However, according to some aspects, the validation is performed before the alternatives are presented to the user.

In an implementation, the design environment can receive high-level goals of the workflow (e.g., increase production by 25%, decrease energy usage by 10%, increase output by 300 items per hour, and so forth), and as part of the verification (e.g., validation process), the validate module 612 can inform the developer that the design will achieve the goals (or that the design will not achieve the goals). In a similar manner, goals and/or objectives can be prioritized and/or weighted based on a variety of metrics (e.g., cost, available resources, time, throughput, and so on) in accordance with the validation.

Figure 7:
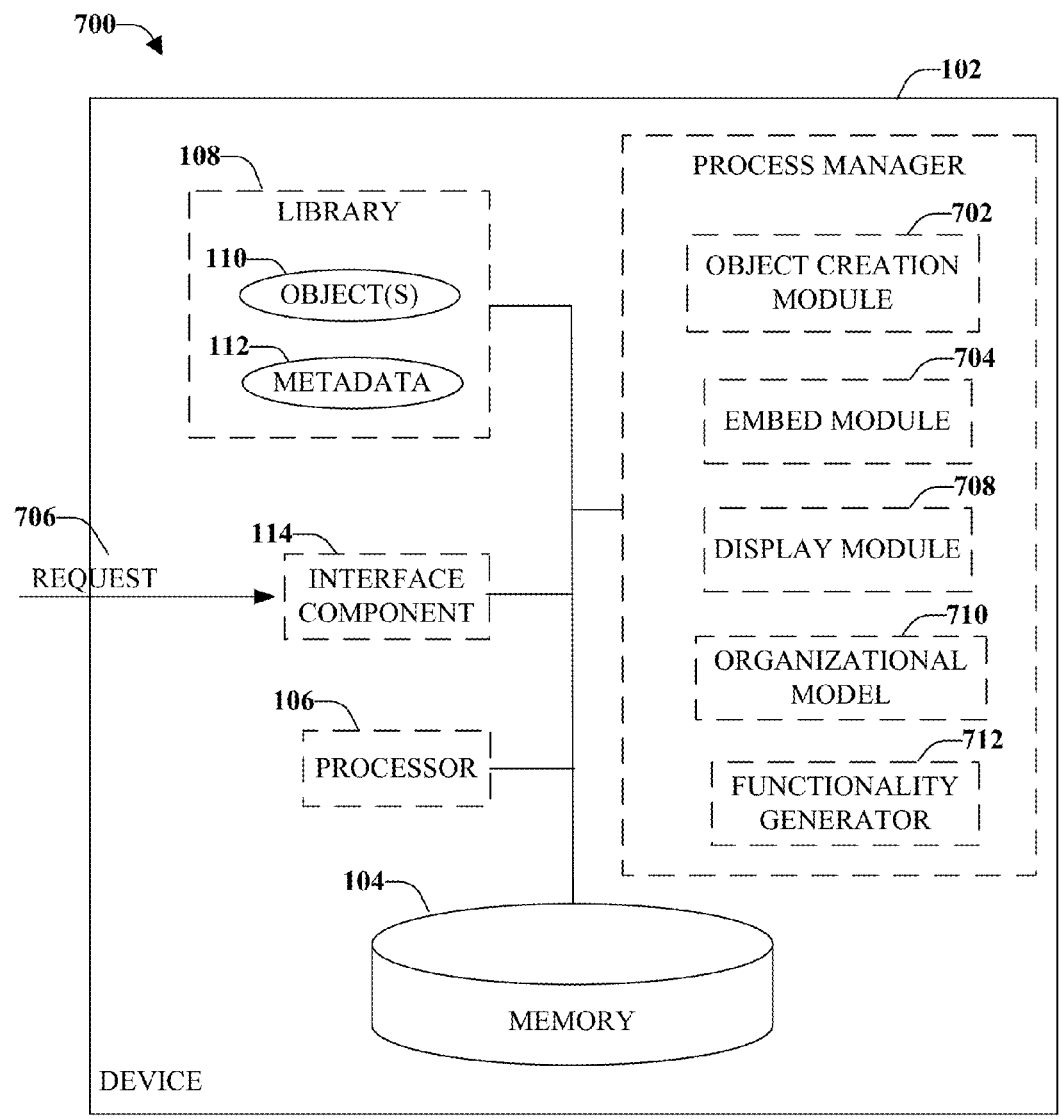
FIG. 7 illustrates an example, non-limiting system configured to generate diagnostic information and capabilities, according to an aspect.

FIG. 7 illustrates an example, non-limiting system 700 configured to generate diagnostic information and capabilities, according to an aspect. In an implementation, diagnostic and/or prognostic functionalities can be integrated into objects such that the diagnostic and/or prognostic functionalities are available from the objects during execution. By way of example and not limitation, diagnostic and/or prognostic functionalities can include features related to preventive maintenance, predictive maintenance, alarms, events, and/or notifications. Other examples of functionalities related to an industrial process or other process can include optimization analysis, workflow optimization, enterprise resource planning (ERP) optimization, context based analysis, overall equipment effectiveness (OEE), environmental remediation, and/or other remediation. Other examples include mitigation of downtime, ordering of new parts, upstream and downstream component/object analyses, profitability, and/or inventory analyses. Further examples include time to failure, time to repair, and/or time to replace.

According to some aspects, default diagnostic and/or prognostic functionalities can be made available at substantially the same time as the objects are made available. Alternatively or additionally, a developer or other user can associate at least a subset of diagnostic and/or prognostic functionalities with an object. For example, based on a request for initiation of a workflow, objects can be retrieved from the library and diagnostic capabilities of each of the objects can be evaluated. If the retrieved objects do not include a diagnostic capability needed for the workflow, a request can be sent to include the missing diagnostic capability in the workflow, wherein an object with the recommended diagnostic capability can be created and/or retrieved from an external source.

System 700 includes an object creation module 702 that can be configured to create a plurality of modular objects. Although illustrated as included in process manager 120, according to an implementation, object creation module 702 can be associated with the data model manager 122 of FIG. 1, for example.

An embed module 704 can be configured to integrate functionalities into each of the modular objects. For example, at least one functionality can be integrated with at least one modular object. The functionalities can be diagnostic capabilities of each modular object. According to an aspect, the functionalities can be prognostic capabilities of the modular objects. In an implementation, the functionalities embedded into each modular object are different functionalities based on analysis of the respective modular object. For example, a first modular object has embedded thereon a first functionality and a second modular object has embedded thereon a second functionality, wherein the first functionality and the second functionality are different functionalities. In accordance with an implementation, the embed module 704 can be configured to embed a set of functionalities into each modular object, wherein the set of functionalities are editable or configurable.

The interface component 114 (or another component) can receive a request 706 for execution of a set of the plurality of modular objects. One or more of the functionalities for each of the modular objects in the set of modular objects can be selectively exposed, by a display module 708, during execution of the set of the plurality of modular objects. In an implementation, the display module 708 and the interface component 114 can be a single component or can be separate components.

In accordance with an implementation, system 700 can include an organization model 710 that can be configured to create and provide a system-wide model of the process, equipment, and/or code. The system-wide model can facilitate user organization of content. Further, the information (e.g., diagnostics, prognostics, alarms, events, and so forth) included in the system-wide model can be grouped, filtered, and/or aggregated up through an organizational hierarchy. For example, the organization model 710 can provide runtime and maintenance value by providing the system-wide model, which allows the user to conceptualize the entire system (e.g., industrial automation system and so on), not just sections of the system.

According to an implementation, the organization model 710 can be defined, at least in part, based on user input. The organization model 710 can be applied to provide context to the diagnostics coming from the one or more objects. Further, the organization model 710 can have a hierarchy that provides context, grouping, and/or aggregation of the data provided by the objects. In an implementation, filters can be applied based on location, role, interest, priority, and so forth.

According to some aspects, pop-ups that expose diagnostic or prognostic functionalities can be provided. In accordance with some aspects, standards or colors can be utilized by the display module 708 to facilitate a glanceable design environment. A glanceable design environment can help visualize re-routing of a workflow and/or an auditing of a process. For example, activities which have occurred can be distinguished from activities that have not occurred.

Further, the display module 708 can provide an interactive visualization tool that allows for quick and easy user selection of diagnostic and/or prognostic functionalities to associate with objects. The tool can leverage historical use, popularity, reliability, context, user preferences, ratings, and so forth to create a rich development environment that allows for seamless and intuitive design of objects with diagnostic functionalities and/or prognostic functionalities.

In an implementation, the application module can evaluate a workflow in which one or more modular objects are to be deployed. The recommendation module can recommend a functionality to associate with the one or more modular objects based in part on the evaluation. The functionality can be exposed by the display module 708 in response to the request 706.

According to another implementation, the display module 708 (or interface component 114) can be configured to produce a visual representation of a list of functionalities. A selection of a functionality from the list of functionalities can be received (e.g., from a user and/or entity). In addition, a selection of an object with which the selected functionality should be associated with can be received. The selected object and functionality are associated (e.g., by the context manager 116). The selection of the functionality and/or the object can be received by the interface component 114, according to an aspect.

In another implementation, a validate module can be configured to verify at least one of an object, a workflow design, and a subset of functionalities are compatible. The verification can be made by the validate module based in part on a data model.

In a further implementation, a combine module can be configured to link a first object with a set of the functionalities. At least a portion of the set of functionalities can be selectively employed based on a use context of the first object. The use context can be derived in part from the request 706 for execution. Additionally or alternatively, the combine component can be configured to link two or more objects as a result of common functionalities.

Additionally or alternatively, a hierarchical association of objects within a workflow can be evaluated. Based on the evaluation, a functionality generator 712 can be configured to create higher level functionalities based on the association of objects within the workflow. According to some aspects, a tool (e.g., functionality generator or another system component) can facilitate the display and/or recommendation of suitable functionalities to associate with objects as a function of a workflow, an expected use, a context, a user preference, or other metrics. In an example, the functionality generator 712 can be configured to link an object with a large set of diagnostic and/or prognostic functionalities and such functionalities can be accessed based on the context of the respective object use.

For example, functionalities of linked objects can be joined or subtracted as a result of the respective object combination(s) (e.g., using an organizational, workflow, or data model). Accordingly, higher level diagnostic and/or prognostic functionalities can be automatically created as a result of a hierarchical association of objects within a workflow.

Figure 8:
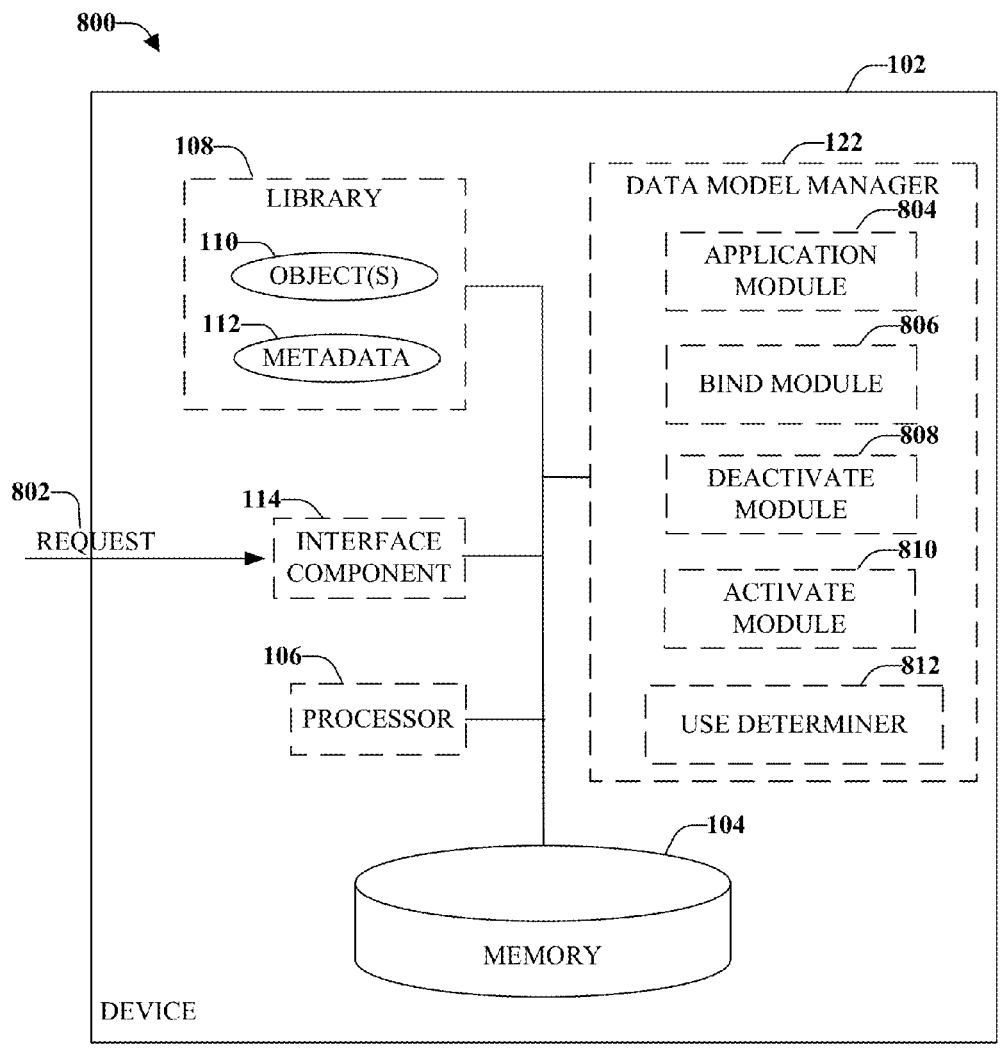
FIG. 8 illustrates an example, non-limiting system configured to facilitate object design, according to an aspect.

FIG. 8 illustrates an example, non-limiting system 800 configured to facilitate object design, according to an aspect. System 800 can facilitate the creation of a hierarchical data model in order to create objects or modules. Further, system 800 can be configured to integrate functionalities into objects as well as applying binding and/or execution rules to the objects. The hierarchical data model can provide an extensible design environment that allows for consistency and ease of object design and deployment. An aspect of the data model is related to object inheritance, which allows for rapid combination of objects to create higher order objects and associated functionality. The model can also have a class-based organization.

An interface component 114 (or another system component) can be configured to output a set of objects and a set of functionalities in response to a request 802 for design of an object. The interface component 114 (or another system component) can be configured to receive a selection of a first object (and/or a subsequent object) from the set of objects and a first functionality (and/or a subsequent functionality) from the set of functionalities. For example, the set of objects and the set of functionalities can be output in a list format (or another format type). A user can select one of the objects and one of the functionalities that should be associated with the selected object.

An application module 804 can be configured to apply a set of rules to the first object and the first functionality. For example, the rules can be predefined and can be specific to a company (e.g., company procedures, company values, and so on), industry specific, or based on other parameters (e.g., customer requirements, environmental regulations, and so on). In an example, the rules can specify whether or not specific users can access the library 108 including accessing and/or modifying the object(s) 110 and/or metadata 112.

In an implementation, the set of rules applied by the application module 804 can provide object inheritance of the first functionality (and subsequent functionalities). A bind module 806 can be configured to bind the first (or subsequent) object and the first (or subsequent) functionality as a result of the applied set of rules. For example, if the first object and the first functionality conform to the set of rules, the binding occurs. However, if the rules are not satisfied, then the binding does not occur and a notification could be conveyed to the user indicating that the functionality cannot be applied to the object.

System 800 can also include a deactivate module 808 that can be configured to selectively deactivate at least a portion of the set of functionalities bound to the at least one object as a function of an identification of a user. The identification of the user can be ascertained when the user logs into an industrial controller (e.g., by entering a user name/password pair or through other means such as a biometric sensor). The identification of a user can relate to the user's role (e.g., manager, operator, and so on) and/or the user's authorization level (e.g., security level). If the user does not have the proper role and/or the proper authorization level, access can be denied through deactivation of the one or more functionalities. The deactivation causes the portions of the set of functionalities (including the first functionality) to be hidden from the user.

Also included in system can be an activate module 810 that can be configured to activate at least a portion of the set of functionalities bound to the at least one object as a function of an identification of the user. The activation causes at least the portion of the set of functionalities (including the first functionality) to be exposed to the user. For example, the set of functionalities might have a default parameter that indicates the functionalities are hidden. However, if the user has the proper credentials, the user is able to perceive the functionalities.

A use determiner 812 can be configured to ascertain an expected use for the first (or subsequent) object. For example, the use determination can be based on discovery of whether the object is being used for its designed purpose (e.g., based on the metadata) or for a different purpose. In another example, the user determination can relate to versioning control and maintenance in order to mitigate an outdated version from being inappropriately applied and/or applied to a wrong context.

Based on the expected use for the first object, the deactivate module 808 can be configured to mask an embedded functionality of the first (or subsequent) object and a linked functionality for the first (or subsequent) object. The mask hides the embedded functionality and the linked functionality from the user (e.g., the user is not able to perceive the functionalities). The linked functionality can be associated with at least a second (or subsequent) object.

In another example, based on the expected use for the first object, the activate module 810 can be configured to unmask an embedded functionality of the first (or subsequent) object and a linked functionality for the first (or subsequent) object. The unmasking exposes the embedded functionality and the linked functionality (e.g., the user is able to perceive the functionalities).

In an implementation, the one or more functionalities can be stored as metadata linked to the respective objects. As discussed above, metadata can include various features associated with the object. Non-limiting example features can include discovery, versioning control and maintenance, atomic elements, and/or non-complex data types. Other example features can include the production/consumption of events at runtime, unified communications (e.g., audio, video, and so on), and/or an object oriented and contextual program. Still other example features include the time-stamping of creation and edits, showing which events have occurred through the use of a timestamp and a queue that accumulates the data, and/or contextualize data with events (e.g., declares event being against a unique product).

As discussed above, the masking and/or unmasking of various embedded of linked functionalities can be utilized to provide the functionality that is right for the context (e.g., intended use, identification of the user, and so forth) rather than just providing a list of functionalities. Since there can be hundreds or thousands of functionalities or parameters, if all the functionalities were provided it could result in confusion. Therefore, system 800 can be configured to provide different people access to the most appropriate information through the selective masking and unmasking of functionalities.

In view of the example systems shown and described herein, methods that may be implemented in accordance with the one or more of the disclosed aspects, will be better understood with reference to the following flow charts. While, for purposes of simplicity of explanation, the methods are shown and described as a series of blocks, it is to be understood that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is noted that the functionality associated with the blocks may be implemented by software, hardware, a combination thereof or any other suitable means (e.g. device, system, process, component). Additionally, it is also noted that the methods disclosed hereinafter and throughout this specification are capable of being stored on an article of manufacture to facilitate transporting and transferring such methodologies to various devices. Those skilled in the art will understand that a method could alternatively be represented as a series of interrelated states or events, such as in a state diagram. The various methods disclosed herein can be performed by a system comprising at least one processor.

Figure 9:
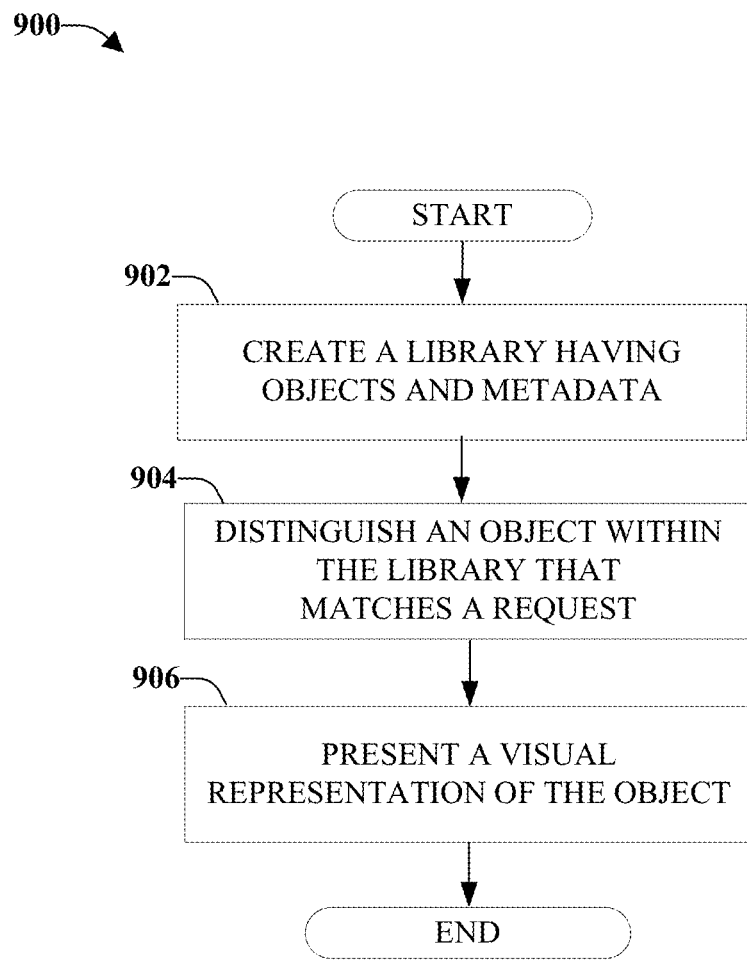
FIG. 9 illustrates an example, non-limiting method for content management, according to an aspect.

FIG. 9 illustrates an example, non-limiting method 900 for content management, according to an aspect. Method 900 starts, at 902, when a library that includes one or more objects and one or more metadata related to the one or more objects is created. The metadata can comprise functionalities of the one or more objects. In another example, the metadata can be industry application specific and can include industry practice information. The library can be a global library hosted through a public network. According to another aspect, the library can be a private library accessible through a private network. According to an implementation, the one or more metadata can be applied to the respective objects of the one or more objects when the respective objects are created and/or at a different time (e.g., when an object is annotated, when objects are merged, and so forth).

At 904, a first object of the one or more objects in the library that matches a request is distinguished from the other objects in the library. A visual representation of the first object and at least a first metadata from the one or more metadata is presented (e.g., output through a display), at 906. The first metadata is related to the first object.

In an implementation, the distinguishing can include mining the request for main attributes and comparing the main attributes to the one or more metadata. Further to this example, it is ascertained whether the first metadata contains at least one of the main attributes. The first metadata can be linked to the first object. Further, the first object can be applied to the visual representation.

Additionally or alternatively, the method 900 can include receiving a request for input related to the first object. Based on the input, the first object can be ranked against the plurality of objects in the database. According to an implementation, the visual representation can be presented in an order based on the ranking.

Figure 10:
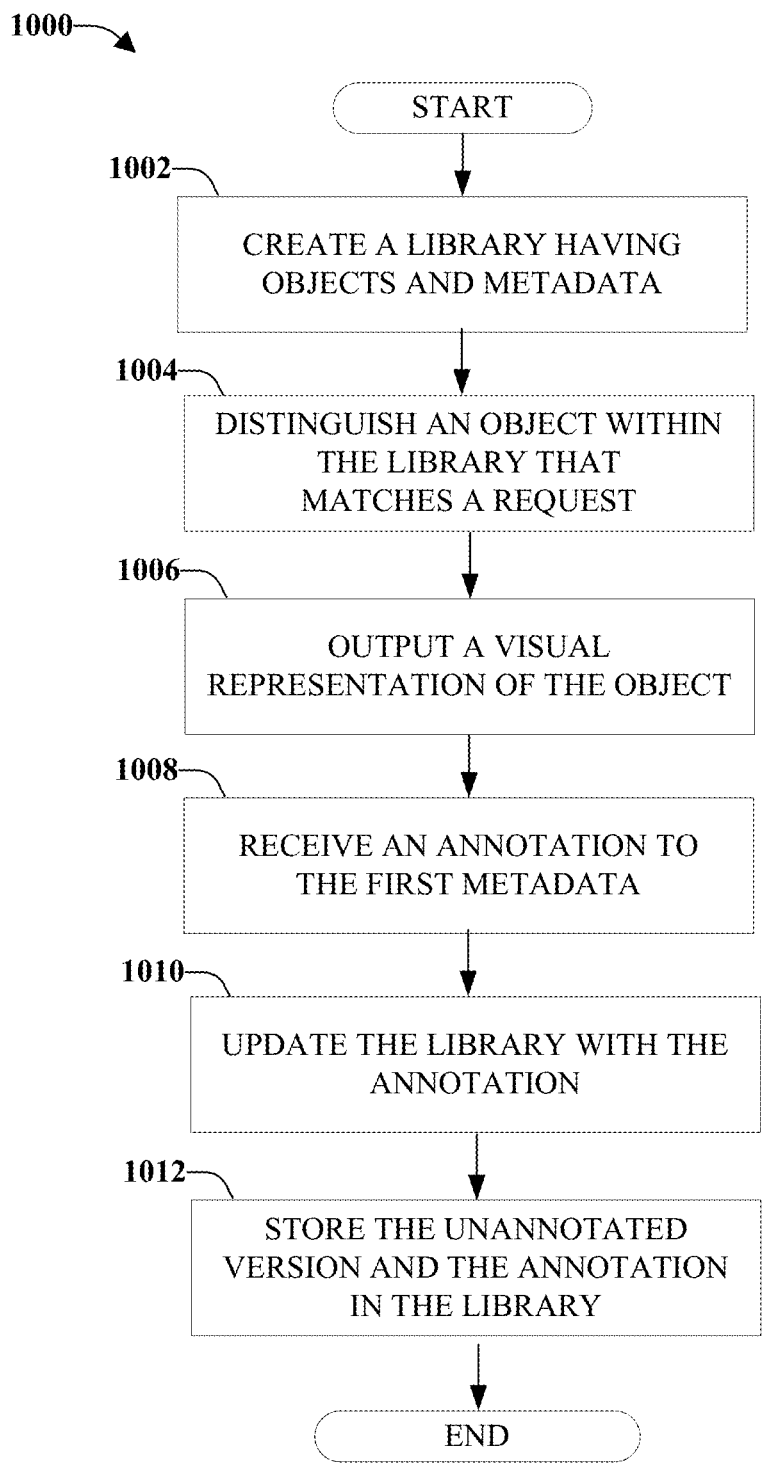
FIG. 10 illustrates an example, non-limiting method for updating a library, according to an aspect.

FIG. 10 illustrates an example, non-limiting method 1000 for updating a library, according to an aspect. At 1002, a library that includes objects and related metadata is created. A request related to implementation of an industrial process is received and, at 1004, a first object from the library is distinguished from other objects in the library. The first object is distinguished if the first object matches the request. The first object and its related metadata is output, at 1006. For example, the output can include a visual representation of the first object and the related metadata.

At 1008, an annotation to the first metadata is received. According to an implementation, the annotation can be received from a user and/or entity. For example, the annotation can include a current use of the object, an alternative use of the object, or other information. The annotation can be input directly into the file that contains the metadata and/or can be received separately and applied to the metadata, according to various implementations.

At 1010, the library is updated to include the annotation. An original or unannotated version of the metadata can be retained (e.g., not updated). This can result in at least two versions of the metadata, the original version and the annotated version. The unannotated version and the annotation are stored in the library, at 1012. A link or mapping can be provided between the unannotated version, the annotation, and the first object. In such a manner, if a previous version of the metadata is needed, the information related to the previous version is available.

Figure 11:
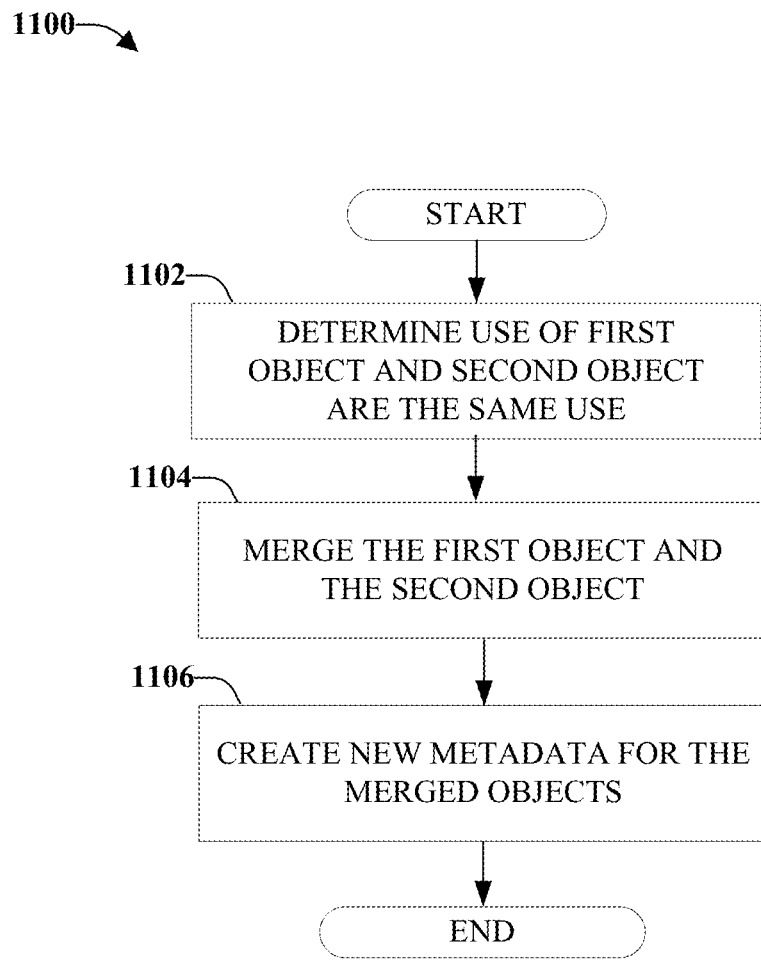
FIG. 11 illustrates an example, non-limiting method for merging two or more objects, according to an aspect.

FIG. 11 illustrates an example, non-limiting method 1100 for merging two or more objects, according to an aspect. At 1102, a first industrial use for a first object and a second industrial use for a second object are determined to be a same industrial use. For example, the determination can be made based on analysis of metadata associated with each of the objects, which can be original (e.g., unannotated) metadata and/or annotated metadata.

At 1104, the first object and at least the second object are merged to create a merged object. According to an implementation, instances of the first object, the second object, and the merged object are retained in the library. At 1106, new metadata can be created as a result of the merging. The new metadata can include a combination of the metadata of the first object and the second object. According to some aspects, the metadata includes information related to the merging. Such information can include, for example, identification of the original objects, information as to why the objects were merged, a timestamp related to when the objects were merged, and so forth.

Figure 12:
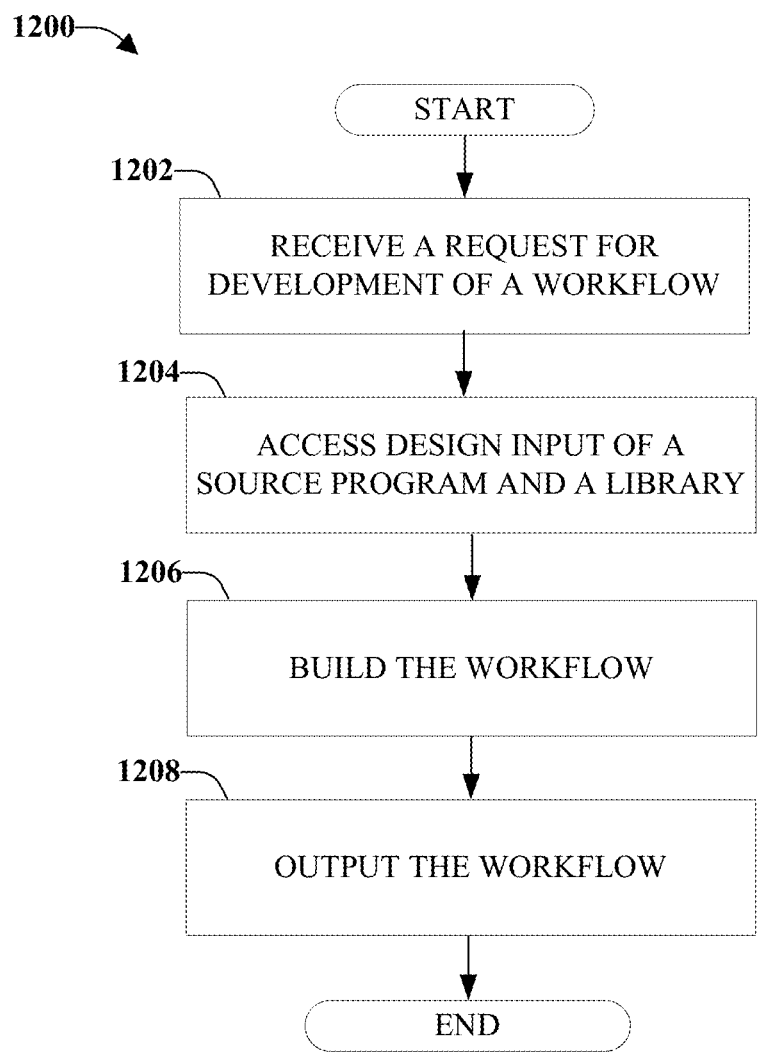
FIG. 12 illustrates an example, non-limiting method for integration of workflows, according to an aspect.

FIG. 12 illustrates an example, non-limiting method 1200 for integration of workflows, according to an aspect. Workflows can be integrated with library objects to enhance and optimize the workflow design.

Method 1200 starts, at 1202, when a request for development of a workflow is received. The request can include a desired outcome or goal of the workflow (e.g., reduce scrap by 3%, increase productivity by 15 units per hour, and so on). According to some aspects, the request can include information related to one or more processes that should be integrated in the workflow (e.g., add a third paint processing step).

At 1204, design input associated with a source program is accessed. The source program can be a program associated with a different system or application. For example, the source program can be design tools and/or objects associated with an external system. Also accessed can be design input associated with a library comprising objects and associated metadata.

The workflow is built, at 1206, based on the design input, the objects, and the associated metadata. At 1208, the workflow is output to a user and/or to an external system. The workflow can be a visual representation of the workflow. In an example, outputting the workflow to the external system can include exporting the workflow to the external system. The objects can comprise modular objects that can be deployed on the external system.

According to an implementation, method 1200 can include applying a set of rules to the design input and to the object and validation can be performed to determine that the workflow conforms to the applied set of rules. In accordance with another implementation, the method 1200 can include prioritizing a set of goals associated with the workflow, the design input, or the objects and validating interoperability of the design input and the objects to the workflow. In another implementation, the method 1200 can include identifying objects from the library that are not used in the workflow and maintaining the objects identified as not used in the workflow for use in a different workflow.

Figure 13:
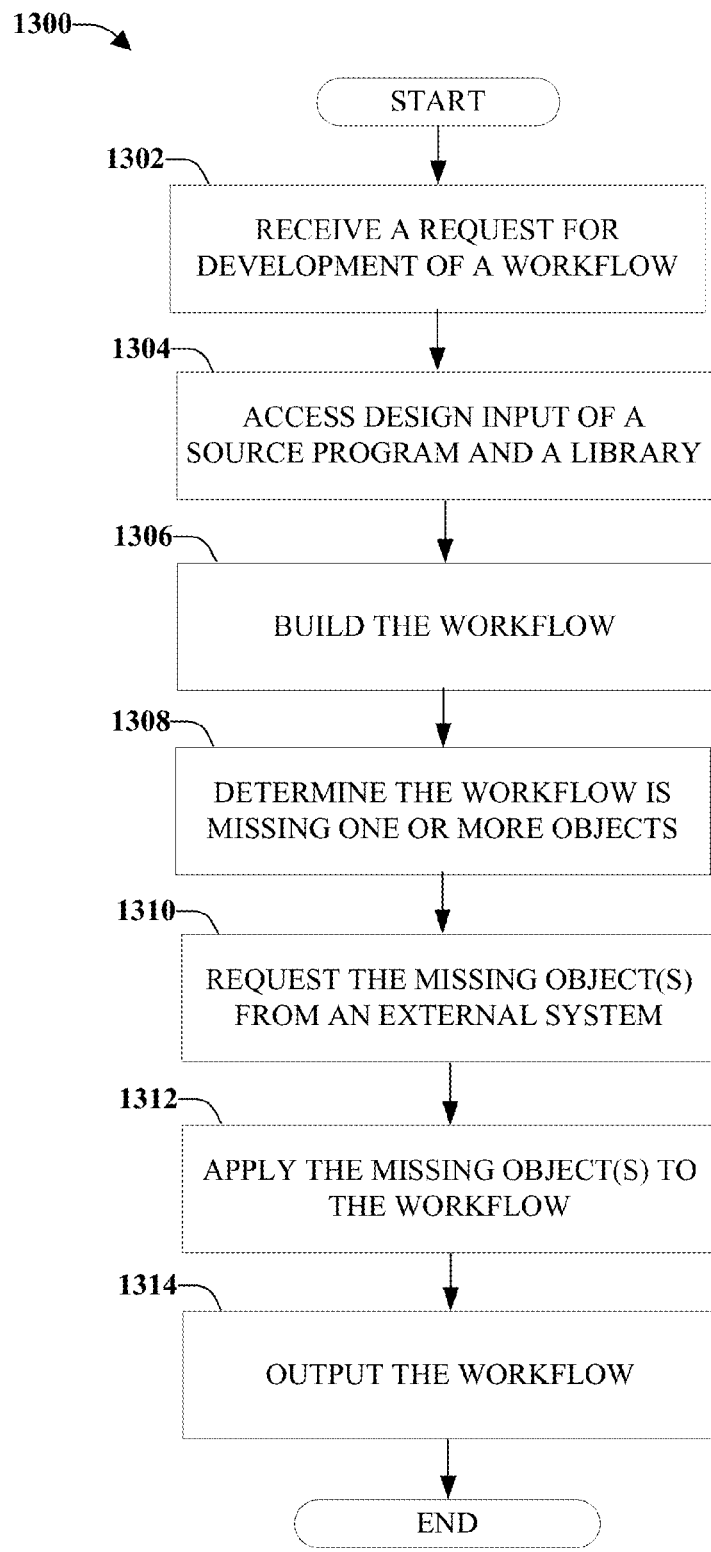
FIG. 13 illustrates an example, non-limiting method configured to identify and obtain objects that are not initially included in a workflow, according to an aspect.

FIG. 13 illustrates an example, non-limiting method 1300 configured to identify and obtain objects that are not initially included in a workflow, according to an aspect. At 1302, a request for development of a workflow is received. Based on the request, at 1304, design input associated with a source program and a library can be accessed. The library includes objects and associated metadata. At 1306, the workflow is built based on the design input, the objects, and the associated metadata.

A determination is made, at 1308, that the workflow is missing objects. For example, the missing objects are not included in the design input or the library but should be included. Such a determination can be made based on metadata associated with the available objects. In a simple example, the metadata of an object related to powder coating might indicate that a next step in the process should be drying. However, an object associated with drying is not included in the design input or the library. Therefore, further to this example, the method can determine that the drying object is missing from the workflow.

At 1310, the missing object(s) are requested from an external system. The external system can include a library that contains objects and metadata, wherein the library maintained by the external system is different from and/or complementary to the library accessed by the method to create the workflow. If the missing object is received from the external system, at 1312, the missing object is applied to the workflow. At 1314, the workflow is presented to the user and/or entity that submitted the request (e.g., an external system).

Figure 14:
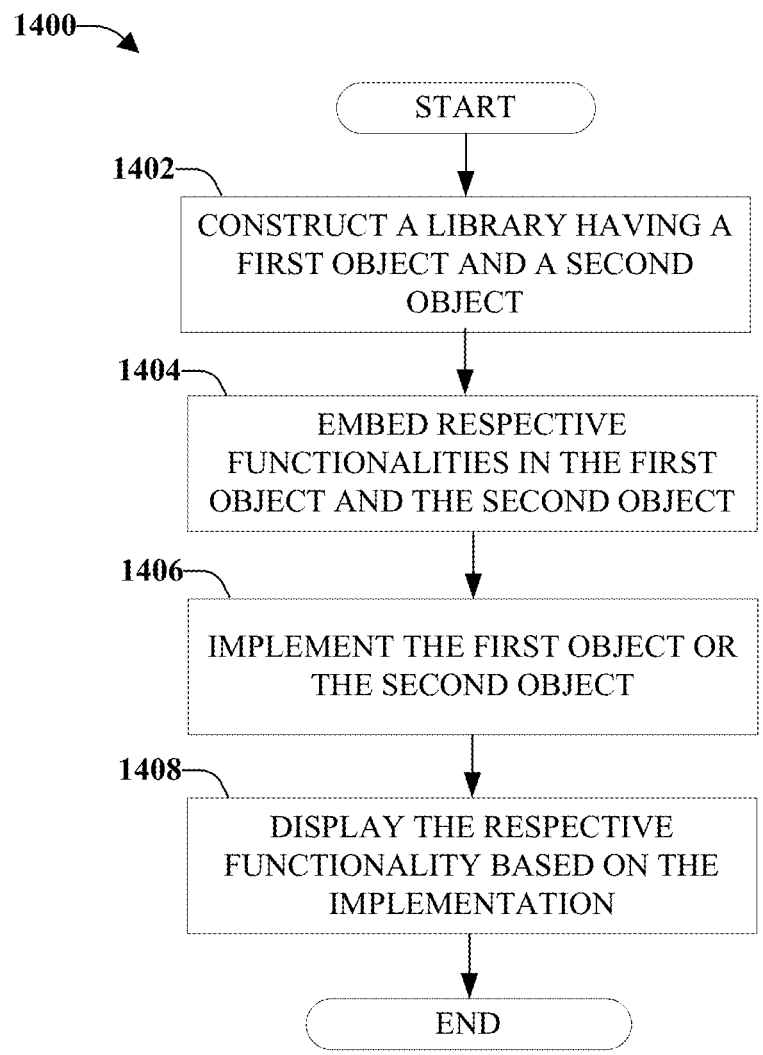
FIG. 14 illustrates an example, non-limiting method for creating objects or modules, according to an aspect.

FIG. 14 illustrates an example, non-limiting method 1400 for creating objects or modules, according to an aspect. At 1402, a library comprising a first object and at least a second object is constructed. A first functionality is embedded with the first object and a second functionality is embedded with the second object, at 1404. According to an implementation, embedding the functionalities can include embedding two or more functionalities into each of the first object and the second object. The library can include two or more functionalities embedded into each of the first object and the second object. The functionalities can be diagnostic capabilities of the respective object. In another example, the functionalities can be prognostic capabilities of the respective object. According to an implementation, the functionalities are editable.

At 1406, at least one of the first object and the second object are executed or implemented. For example, the first object and the second object can be executed based on a request. According to an implementation, executing the objects can include receiving a request to initiate a workflow and evaluating the workflow. At least one of the first object and the second object can be executed based on parameters of the workflow. Further to this implementation, an additional functionality to be associated with at least one of the first object and the second object can be recommended based on the evaluation.

At 1408, the first functionality, the second functionality, or both the first functionality and the second functionality are displayed as a result of the executing. The functionalities can be exposed during execution of the first object and/or the second object. According to an implementation, displaying the functionalities can include creating a visual representation of the workflow and outputting the visual representation. The visual representation can comprise the first functionality, the second functionality, or both the first functionality and the second functionality.

Figure 15:
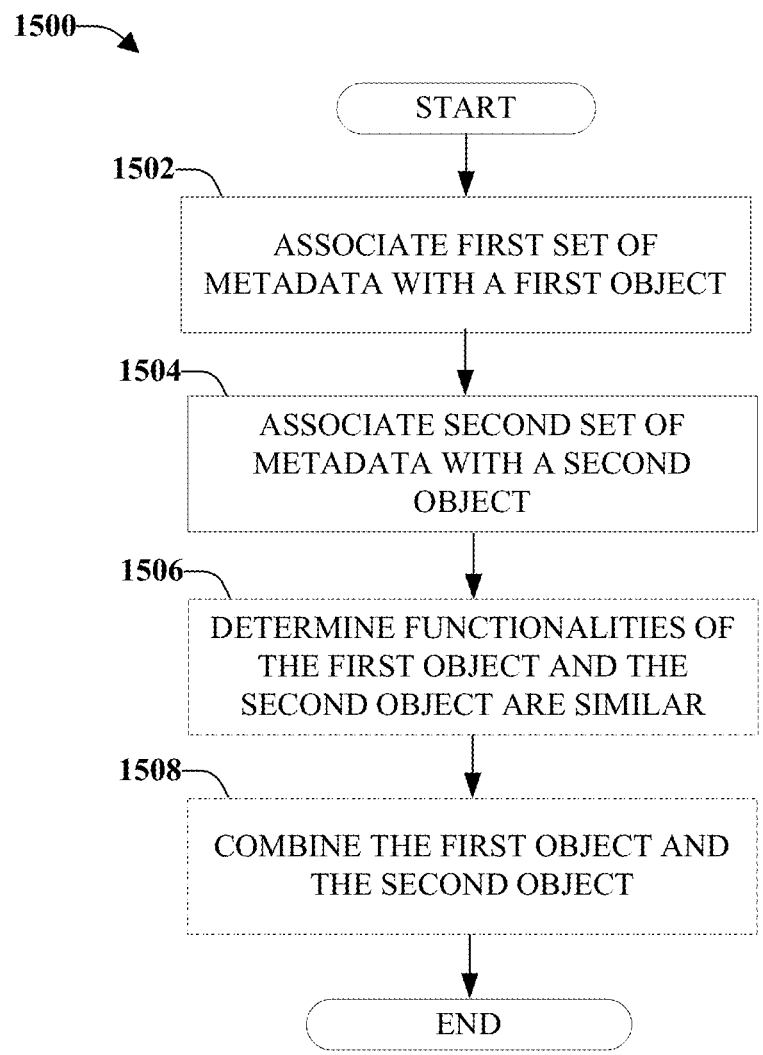
FIG. 15 illustrates an example, non-limiting method for embedding functionalities with a merged object, according to an aspect.

FIG. 15 illustrates an example, non-limiting method 1500 for embedding functionalities with a merged object, according to an aspect. At 1502, a first set of metadata is associated with a first object. The first set of metadata can comprise, in part, the first functionality. At 1504, a second set of metadata is associated with the second object. The second set of metadata can comprise, in part, the second functionality. According to an implementation, the first functionality and the second functionality can be different functionalities.

In an implementation where the first functionality and the second functionality are similar functionalities, method 1500 can continue, at 1506, with a determination that the first functionality and the second functionality are a same (or a similar) functionality. Further to this implementation, at 1508 the first object and the second object are combined based on the determination that the functionalities are the same (or are similar).

Figure 16:
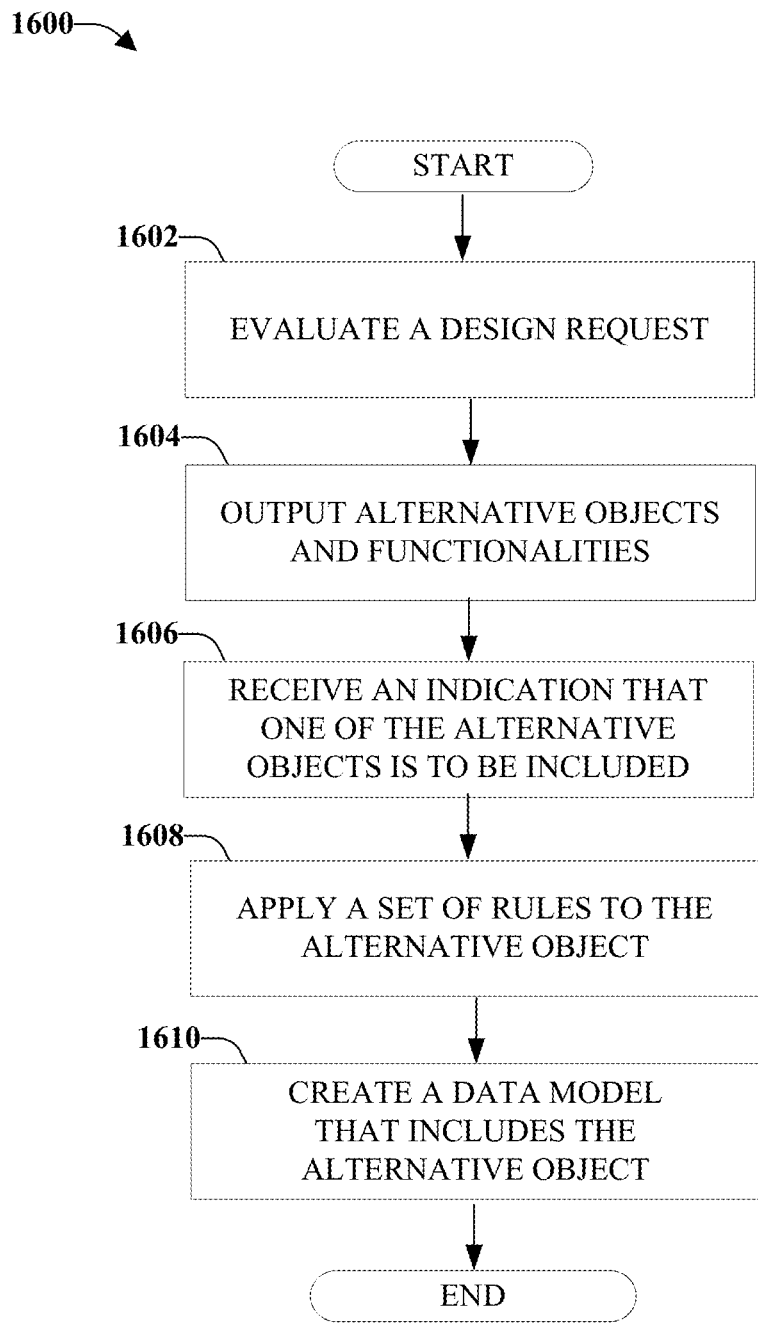
FIG. 16 illustrates an example, non-limiting method for object design, according to an aspect.

FIG. 16 illustrates an example, non-limiting method 1600 for object design, according to an aspect. At 1602, a design request for a data model comprising a set of objects is evaluated. According to an implementation, the evaluation can include searching metadata embedded in the set of objects for functionalities that support the data model.

At 1604, alternative objects and associated functionalities related to the data model is output. For example, the alternative objects and associated functionalities can be output to allow a user to decide which object of the alternative objects should be used for the data model. At 1606, an indication is received. The indication is that one or more of the alternative objects and associated functionalities are to be included in the data model.

At 1608, a set of rules is applied to the included one or more alternative objects and associated functionalities. If the alternative objects and associated functionalities do not conform to the rules, the alternative object is not applied to the data model. According to an implementation, a determination whether the alternative object conforms to the set of rules can be made before the selection of the alternative objects are presented to the user.

If the alternative objects and associated functionalities do not conform to the rules, the data model is created, at 1610. The data model can comprise the selected one or more alternative objects, the associated functionalities, and the applied set of rules.

Figure 17:
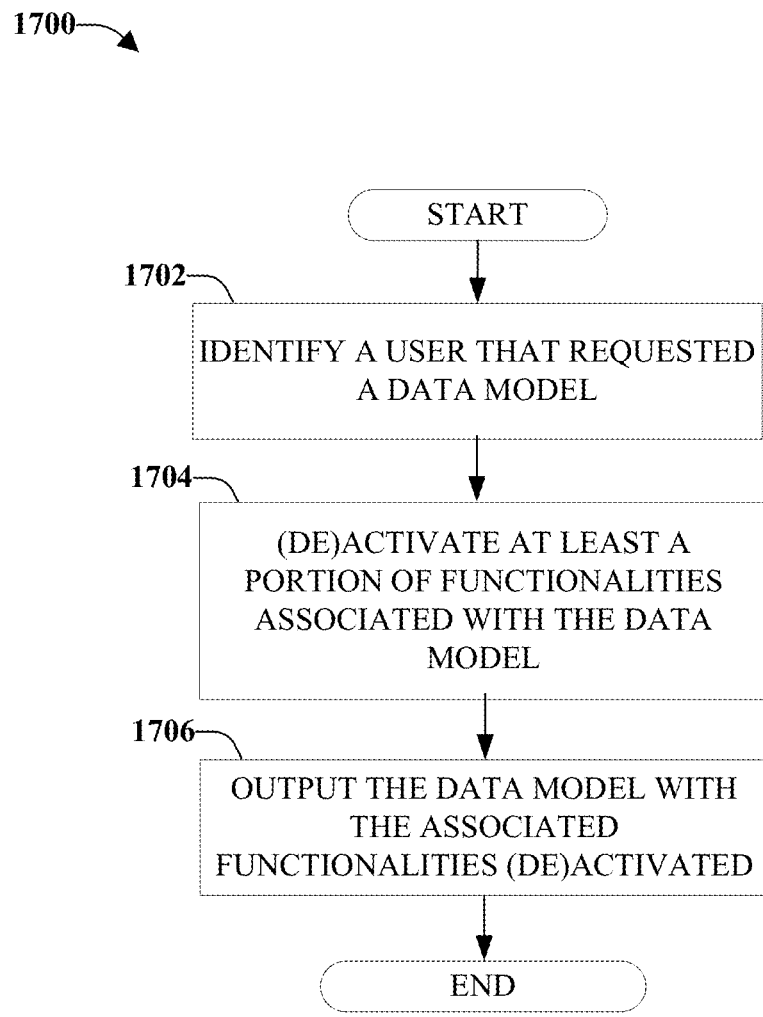
FIG. 17 illustrates an example, non-limiting method for selectively masking and/or unmasking data, according to an aspect.

FIG. 17 illustrates an example, non-limiting method 1700 for selectively masking and/or unmasking data, according to an aspect. Selectively masking and/or unmasking data can provide the user with the most meaningful data available to create a data model, for example. Thus, rather than output all the functionalities that are available, which can be over a hundred (or over a thousand) different functionalities, the functionalities can be tailored for the specific user based on information known about the user.

Method 1700 starts, at 1702, when an identification of a user that requested the data model is ascertained. According to one implementation, at 1704, at least a portion of the associated functionalities related to the data model are deactivated based on the identification of the user. The deactivating can include determining that the user does not have access rights to at least the portion of the associated functionalities. Further to this implementation, at 1706, the data model is output with at least the portion of the associated functionalities deactivated. The deactivation hides the associated functionalities from user view.

According to another implementation, at 1704, at least a portion of the associated functionalities related to the data model are activated based on the identification of the user. The activating can include determining that the user has access rights to at least the portion of the associated functionalities. Further to this implementation, at 1706, the data model is output with at least the portion of the associated functionalities activated. The activation enables the associated functionalities to be viewed by the user.

Figure 18:
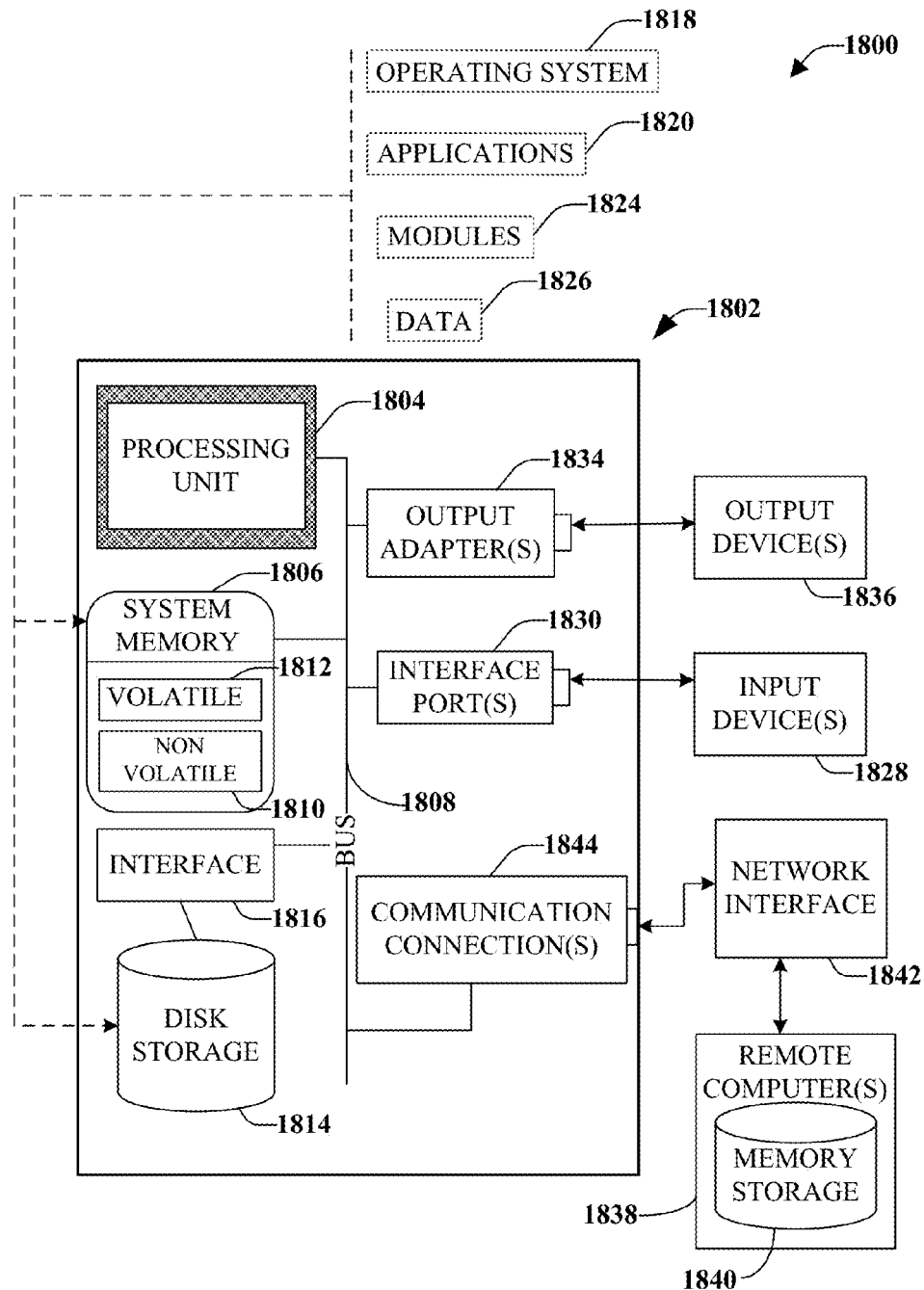
FIG. 18 illustrates a block diagram of a computer operable to execute the disclosed aspects.

Referring now to FIG. 18, illustrated is a block diagram of a computer operable to execute the disclosed aspects. In order to provide additional context for various aspects, FIG. 18 and the following discussion are intended to provide a brief, general description of a suitable computing environment 1800 in which the various aspects of the embodiment(s) can be implemented. While the description above is in the general context of computer-executable instructions that may run on one or more computers, those skilled in the art will recognize that the various embodiments can be implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, single-board computers, minicomputers, mainframe computers, as well as personal computers, handheld computing devices, microprocessor-based or programmable consumer electronics, micro-controllers, embedded controllers, multi-core processors, and the like, each of which can be operatively coupled to one or more associated devices.

The illustrated aspects of the various embodiments may also be practiced in distributed computing environments where certain tasks are performed by remote processing devices that are linked through a communications network. In a distributed computing environment, program modules can be located in both local and remote memory storage devices. A computing platform can host or permit processing of all or many distinct logical agents. Alternatively, each agent may operate in a separate, networked processor that is centrally located or possibly located, or integrated with, the process or process equipment that it manages (e.g., a single-board computer running an oven agent may be embedded in an oven controller). Various degrees of centralized processing and distributed processing may be implemented.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, DRAM, flash memory, memory sticks or solid state memory, or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, microwave, RF, infrared and other wireless methods (e.g., IEEE 802.12x, IEEE 802.15.4, Bluetooth).

In an implementation, provided is a non-transitory or tangible computer-readable medium storing computer-executable instructions. The non-transitory computer-readable storage medium can have stored thereon computer-executable instructions that, in response to execution, cause a computing device including a processor to perform operations. The operations can comprise populating a library with objects and associated metadata, wherein each metadata can be associated with one or more objects. The operations can also include evaluating the associated metadata in response to a query for an industrial application and determining at least one metadata matches the query. Further, the operations can include outputting at least one object associated with the at least one metadata as a result of the query.

Additionally, the operations can include comparing a received ranking of the at least one object against rankings received for other objects and outputting a second object, wherein a visual representation of the at least one object and the second object are presented in an order based on the comparing. Additionally or alternatively, the operations can include monitoring industrial applications where each of the objects are used, merging two or more objects as a result of the monitoring, and creating new metadata for the merged two or more objects.

In accordance with another implementation, the operations can include receiving a request for automation of an industrial control process and obtaining, from an external source, objects for use in the automation of the industrial control process. Further, the operations can include applying the objects from the external source to a design of the automation of the industrial control process and identifying at least one object not received from the external source, wherein the at least one object is to be used in the design. The operations can also include importing the at least one object from a second external source.

Additionally, the operations can include querying a library comprising a plurality of objects for the at least one object, evaluating metadata associated with the plurality of objects, and importing the at least one object from the library into the workflow. Additionally or alternatively, the operations can include exporting the workflow to a target system, wherein the workflow comprises objects comprising a common interface and the workflow is deployed on the target system.

According to another implementation, the operations can include receiving an indication to initiate a workflow, wherein the workflow comprises a plurality of objects. The operations can also include retrieving the plurality of objects from a library, wherein each of the plurality of objects comprises a respective diagnostic capability. The operations can also include evaluating the respective diagnostic capability of each of the plurality of objects and recommending a diagnostic capability for the workflow, wherein the hierarchical associated being predefined and provides diagnostic context for the plurality of objects. The recommended diagnostic capability is not included in the respective diagnostic capabilities of the plurality of objects.

Further to this implementation, the operations can include evaluating a hierarchical association of the plurality of objects in the workflow and creating a functionality for one of the plurality of objects as a result of the evaluating. Additionally or alternatively, the operations can include producing a representation of the workflow, the representation includes the plurality of objects and the respective diagnostic capabilities. The operations can also include receiving a selection of one of the respective diagnostic capabilities and initiating a diagnostic procedure on at least a portion of the workflow based on the selection.

In accordance with another implementation, the operations can include retrieving a set of objects and associated metadata from an object library, wherein the set of objects are recommended for a hierarchical data model, and receiving a selection of one or more objects from the set of objects. The operations can also include applying a rule to the selected one or more objects, determining at least one object of the selected one or more objects is validated by the rule, and incorporating the at least one object into the hierarchical data model.

Further to this implementation, the operations can include evaluating a request for the hierarchical data model, wherein the request comprises user identity information, masking the associated metadata for the at least one object as a function of the evaluating, and presenting the hierarchical data model, wherein the masked associated metadata is hidden from the user. Additionally or alternatively, the operations can include evaluating a request for the hierarchical data model, wherein the request comprises user identity information, unmasking the associated metadata for at least one object based on the evaluating, and presenting the hierarchical data model, wherein the associated metadata is exposed to the user as a function of the evaluating.

With reference again to FIG. 18, the illustrative environment 1800 for implementing various aspects includes a computer 1802, which includes a processing unit 1804, a system memory 1806 and a system bus 1808. The system bus 1808 couples system components including, but not limited to, the system memory 1806 to the processing unit 1804. The processing unit 1804 can be any of various commercially available processors. Dual microprocessors, custom processors, custom integrated-circuits, multi-core processor arrays, analog processors, pipeline processors, and other multi-processor architectures may also be employed as the processing unit 1804.

The system bus 1808 can be any of several types of bus structure that may further interconnect to a memory bus (with or without a memory controller), a peripheral bus, and a local bus using any of a variety of commercially available bus architectures. The system memory 1806 includes read-only memory (ROM) 1810 and random access memory (RAM) 1812. A basic input/output system (BIOS) is stored in a non-volatile memory 1810 such as ROM, EPROM, EEPROM, which BIOS contains the basic routines that help to transfer information between elements within the computer 1802, such as during start-up. The RAM 1812 can also include a high-speed RAM such as static RAM for caching data.

The computer 1802 further includes a disk storage 1814, which can include an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette) and an optical disk drive (e.g., reading a CD-ROM disk or, to read from or write to other high capacity optical media such as the DVD). The hard disk drive, magnetic disk drive and optical disk drive can be connected to the system bus 1808 by a hard disk drive interface, a magnetic disk drive interface and an optical drive interface, respectively. The interface 1816 for external drive implementations includes at least one or both of Universal Serial Bus (USB) and IEEE 1094 interface technologies. Other external drive connection technologies are within contemplation of the various embodiments described herein.

The drives and their associated computer-readable media provide nonvolatile storage of data, data structures, computer-executable instructions, and so forth. For the computer 1802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the illustrative operating environment, and further, that any such media may contain computer-executable instructions for performing the disclosed aspects.

A number of program modules can be stored in the drives and RAM, including an operating system 1818, one or more application programs 1820, other program modules 1824, and program data 1826. All or portions of the operating system, applications, modules, and/or data can also be cached in the RAM. It is to be appreciated that the various embodiments can be implemented with various commercially available operating systems or combinations of operating systems or may be implemented without an operating system.

A user can enter commands and information into the computer 1802 through one or more wired/wireless input devices 1828, such as a keyboard and a pointing device, such as a mouse. Other input devices (not shown) may include a microphone, an IR remote control, a joystick, a game pad, a stylus pen, touch screen, or the like. These and other input devices are often connected to the processing unit 1804 through an input device (interface) port 1830 that is coupled to the system bus 1808, but can be connected by other interfaces, such as a parallel port, an IEEE 1094 serial port, a game port, a USB port, an IR interface, etc. Additionally, the interface ports 1830 may include one or more channels of digital and/or analog input. The interface ports for analog signals will receive for example a voltage input coming from a process sensor such as a temperature sensor. The voltage input to the interface ports 1830 from the temperature sensor may vary linearly with the temperature of the sensor. The interface port will generate a digital value that corresponds to the voltage presented to the interface ports. The digital representation of the sensor value will be processed, averaged, or filtered as needed for use by applications 1820 and/or modules 1824. The interface ports may also receive digital inputs such from a switch or a button and similarly provide this digital value to applications 1820 and/or modules 1824.

A monitor or other type of display device is also connected to the system bus 1808 via an output (adapter) port 1834, such as a video adapter. In addition to the monitor, a computer typically includes other peripheral output devices 1836, such as speakers, printers, etc. The output adapters may also provide one or more digital and/or analog values for use by display, control, or other computer-based devices. For example, the output adapter 1834 could provide a voltage signal between about 0 volts and 10 volts that correspond to the desired speed of a mixing motor such that about 0 volts corresponds to around 0 rpm (revolutions per minute) and about 10 volts corresponds to around 1200 rpm.

The computer 1802 may operate in a networked environment using logical connections via wired and/or wireless communications to one or more remote computers, such as a remote computer(s) 1838. The remote computer(s) 1838 can be a workstation, a server computer, a router, a personal computer, portable computer, microprocessor-based entertainment appliance, a peer device or other common network node, and typically includes many or all of the elements described relative to the computer 1802, although, for purposes of brevity, only a memory/storage device 1840 is illustrated. Multiple computers may operate in an integrated manner to control a single (e.g., multi-step) production process. Process control tasks may be distributed across multiple computers. For example, an agent-based control architecture may have all the agents reside in a single computer-based controller or may have several or more agents reside in several computer-based controllers, or have each agent reside in a separate computer-based controller.

The remote computer(s) can have a network interface 1842 that enables logical connections to computer 1802. The logical connections include wired/wireless connectivity to a local area network (LAN) and/or larger networks, e.g., a wide area network (WAN). Such LAN and WAN networking environments are commonplace in offices and companies, and facilitate enterprise-wide computer networks, such as intranets, all of which may connect to a global communications network, e.g., the Internet.

When used in a LAN networking environment, the computer 1802 is connected to the local network through a wired and/or wireless communication network interface or adapter (communication connection(s)) 1844. The adaptor 1844 may facilitate wired or wireless communication to the LAN, which may also include a wireless access point disposed thereon for communicating with the wireless adaptor.

When used in a WAN networking environment, the computer 1802 can include a modem, or is connected to a communications server on the WAN, or has other means for establishing communications over the WAN, such as by way of the Internet. The modem, which can be internal or external and a wired or wireless device, is connected to the system bus 1808 via the serial port interface. In a networked environment, program modules depicted relative to the computer 1802, or portions thereof, can be stored in the remote memory/storage device 1840. It will be appreciated that the network connections shown are illustrative and other means of establishing a communications link between the computers can be used.

The computer 1802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 19:
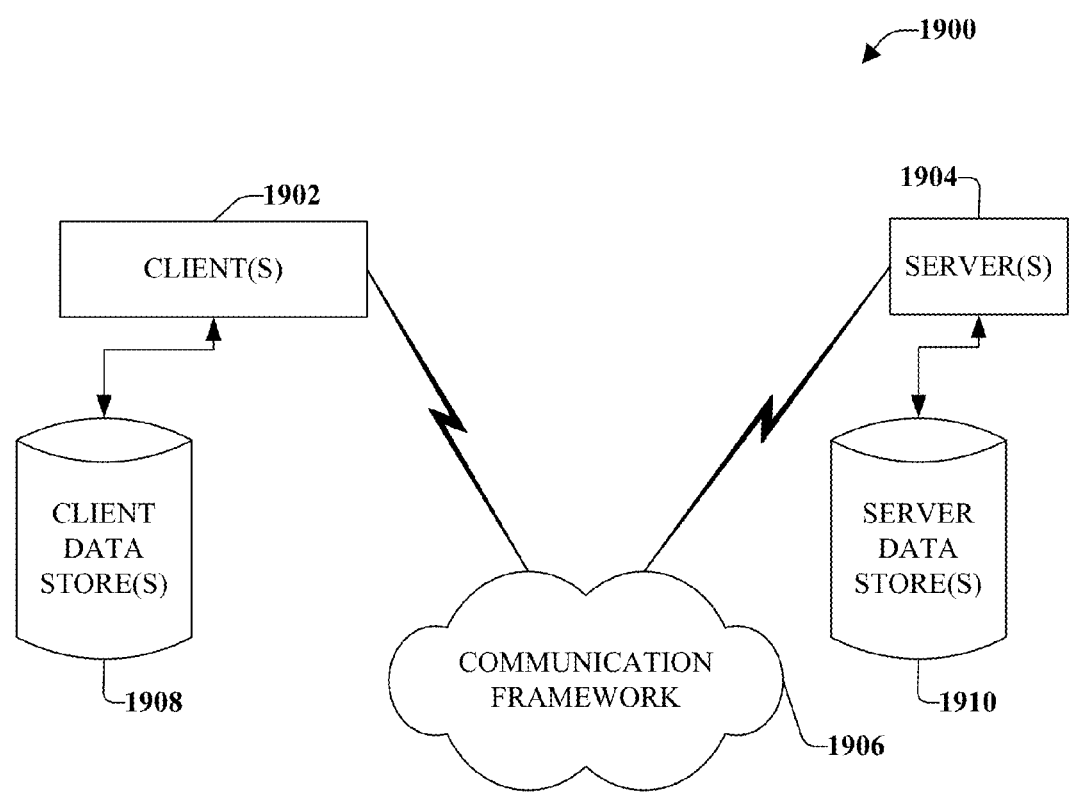
FIG. 19 illustrates a schematic block diagram of an exemplary computing environment, according to an aspect.

Referring now to FIG. 19, there is illustrated a schematic block diagram of an illustrative computing environment 1900 for processing the disclosed architecture in accordance with another aspect. The environment 1900 includes one or more client(s) 1902. The client(s) 1902 can be hardware and/or software (e.g., threads, processes, computing devices). The client(s) 1902 can house cookie(s) and/or associated contextual information in connection with the various embodiments, for example.

The environment 1900 also includes one or more server(s) 1904. The server(s) 1904 can also be hardware and/or software (e.g., threads, processes, computing devices). The servers 1904 can house threads to perform transformations in connection with the various embodiments, for example. One possible communication between a client 1902 and a server 1904 can be in the form of a data packet adapted to be transmitted between two or more computer processes. The data packet may include a cookie and/or associated contextual information, for example. The environment 1900 includes a communication framework 1906 (e.g., a global communication network such as the Internet) that can be employed to facilitate communications between the client(s) 1902 and the server(s) 1904.

Communications can be facilitated via a wired (including optical fiber) and/or wireless technology. The client(s) 1902 are operatively connected to one or more client data store(s) 1908 that can be employed to store information local to the client(s) 1902 (e.g., cookie(s) and/or associated contextual information). Similarly, the server(s) 1904 are operatively connected to one or more server data store(s) 1910 that can be employed to store information local to the servers 1904.

The various techniques described herein may be implemented in connection with hardware or software or, where appropriate, with a combination of both. As used in this application, the terms "component", "module", "object", "service", "model", "representation", "system", "interface", or the like are generally intended to refer to a computer-related entity, either hardware, a combination of hardware and software, software, or software in execution. For example, a component can be, but is not limited to being, a process running on a processor, a processor, a hard disk drive, a multiple storage drive (of optical and/or magnetic storage medium), an object, an executable, a thread of execution, a program, and/or a computer. By way of illustration, both an application running on a controller and the controller can be a component. One or more components can reside within a process and/or thread of execution and a component can be localized on one computer and/or distributed between two or more computers, industrial controllers, or modules communicating therewith. As another example, an interface can include I/O components as well as associated processor, application, and/or API components.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

The subject matter as described above includes various exemplary aspects. However, it should be appreciated that it is not possible to describe every conceivable component or methodology for purposes of describing these aspects. One of ordinary skill in the art may recognize that further combinations or permutations may be possible. Various methodologies or architectures may be employed to implement the subject invention, modifications, variations, or equivalents thereof. Accordingly, all such implementations of the aspects described herein are intended to embrace the scope and spirit of subject claims.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A system, comprising:
a memory that stores executable instructions; and
a processor, communicatively coupled to the memory, that facilitates execution of the executable instructions to at least:
populate a library with a plurality of modular objects and metadata associated with the plurality of modular objects;
search the library, in response to a query related to implementation of an industrial process, wherein the search is based in part on the metadata;
receive ratings for the plurality of modular objects;
rank the plurality of modular objects as a function of the ratings;
identify one or more modular objects from the plurality of modular objects that satisfy the query; and
output a result of the query, wherein the output includes the one or more modular objects and respective metadata associated with the one or more modular objects, and wherein the output is in an order based on the rank.

2. The system of claim 1, wherein the processor further facilitates execution of the executable instructions to:
apply an annotation to at least one metadata to create at least one annotated metadata; and
update the library with the at least one annotated metadata.

3. The system of claim 1, wherein the processor further facilitates execution of the executable instructions to:
receive metadata associated with a first modular object of the plurality of modular objects when the first modular object is created.

4. The system of claim 1, wherein the processor further facilitates execution of the executable instructions to:
extract key terms from the query;
match the key terms to the metadata;
access a modular object associated with the metadata that matches the key terms; and
return the modular object as the result of the query.

5. The system of claim 1, wherein the processor further facilitates execution of the executable instructions to:
suggest a subset of modular objects from the plurality of modular objects to employ for implementation of the industrial process.

6. The system of claim 1, wherein the processor further facilitates execution of the executable instructions to:
observe usage of the plurality of modular objects;
combine two or more modular objects of the plurality of modular objects as a result of the observed usage; and
create new metadata based on the combination of the two or more modular objects.

7. The system of claim 1, wherein the metadata comprises functionalities of an associated modular object.

8. The system of claim 1, wherein the metadata is industry application specific and includes industry practice information.

9. The system of claim 1, wherein the library is a global library hosted through a public network.

10. The system of claim 1, wherein the library is a private library accessible through a private network.

11. A method, comprising:
creating, by a system including a processor, a library that includes one or more objects and one or more metadata related to the one or more objects;
distinguishing, by the system, a first object of the one or more objects in the library that matches a request;
requesting, by the system, input related to the first object;
ranking, by the system, the first object against the one or more objects based on the input; and
presenting, by the system, a visual representation of the first object and at least a first metadata from the one or more metadata, wherein the first metadata is related to the first object, and wherein the visual representation is presented in an order based on the ranking.

12. The method of claim 11, wherein the distinguishing comprises:
mining the request for main attributes;
comparing the main attributes to the one or more metadata;
ascertaining the first metadata contains at least one of the main attributes, wherein the first metadata is linked to the first object; and
applying the first object to the visual representation.

13. The method of claim 11, further comprising:
applying, by the system, the one or more metadata to respective objects of the one or more objects when the respective objects are created.

14. The method of claim 11, further comprising:
receiving, by the system, an annotation to the first metadata;
updating, by the system, the library with the annotation, wherein an unannotated version of the first metadata is not updated; and
storing, by the system, the unannotated version and the annotation in the library, wherein the unannotated version, the annotation, and the first object are linked.

15. The method of claim 11, further comprising:
determining, by the system, a first industrial use for the first object and a second industrial use for at least a second object is a same industrial use;
merging, by the system, the first object and at least the second object; and
creating, by the system, new metadata as a result of the merging.

16. A non-transitory computer-readable storage medium having stored thereon executable instructions that, in response to execution, cause a computing device including a processor to perform operations, the operations comprising:

populating a library with objects and associated metadata, wherein each metadata can be associated with one or more objects;

evaluating the associated metadata in response to a query for an industrial application;

determining at least one metadata matches the query;

outputting at least one object associated with the at least one metadata as a result of the query;

comparing a received ranking of the at least one object against rankings received for other objects; and outputting a second object, wherein a visual representation of the at least one object and the second object are presented in an order based on the comparing.

17. The non-transitory computer-readable storage medium of claim 16, wherein the operations further comprise:

monitoring industrial applications where each of the objects are used;

merging two or more objects as a result of the monitoring; and creating new metadata for the merged two or more objects.

18. The non-transitory computer-readable storage medium of claim 16, wherein the operations further comprise:

applying at least one annotation to at least one metadata of the associated metadata;

generating at least one annotated metadata based on the at least one annotation; and updating the library to include the at least one annotated metadata.

19. The non-transitory computer-readable storage medium of claim 16, wherein the operations further comprise:

extracting key terms from the query;

matching the key terms to the associated metadata;

accessing a modular object that matches the key terms, wherein the modular object is linked to the associated metadata; and returning the modular object as the result of the query.

20. The non-transitory computer-readable storage medium of claim 16, wherein the operations further comprise:

identifying one or more modular objects from a plurality of modular objects that satisfy the query; and suggesting a subset of modular objects from a plurality of modular objects to employ for the industrial application.

* * * * *